(12) United States Patent
You et al.

(10) Patent No.: US 10,306,618 B2
(45) Date of Patent: May 28, 2019

(54) METHOD AND WIRELESS DEVICE FOR RECEIVING DOWNLINK CONTROL CHANNEL

(71) Applicant: LG ELECTRONICS INC., Seoul (KR)

(72) Inventors: Hyangsun You, Seoul (KR); Hanbyul Seo, Seoul (KR); Yunjung Yi, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 76 days.

(21) Appl. No.: 15/553,969

(22) PCT Filed: Mar. 4, 2016

(86) PCT No.: PCT/KR2016/002172
§ 371 (c)(1),
(2) Date: Aug. 25, 2017

(87) PCT Pub. No.: WO2016/140541
PCT Pub. Date: Sep. 9, 2016

(65) Prior Publication Data
US 2018/0249446 A1    Aug. 30, 2018

Related U.S. Application Data

(60) Provisional application No. 62/154,664, filed on Apr. 29, 2015, provisional application No. 62/128,972, filed on Mar. 5, 2015.

(51) Int. Cl.
*H04W 72/04* (2009.01)
*H04L 1/18* (2006.01)
(Continued)

(52) U.S. Cl.
CPC ............. *H04W 72/042* (2013.01); *H04L 1/00* (2013.01); *H04L 1/18* (2013.01); *H04L 1/1812* (2013.01); *H04L 5/00* (2013.01); *H04W 4/70* (2018.02)

(58) Field of Classification Search
None
See application file for complete search history.

(56) References Cited

U.S. PATENT DOCUMENTS 8,588,347 B1 * 11/2013 Petrovic .................... H04L 1/08
375/340
2015/0078348 A1 * 3/2015 Han ........................ H04W 4/70
370/336
(Continued)

FOREIGN PATENT DOCUMENTS

WO   2014/110781 A1   7/2014
WO   2015/012666 A1   1/2015

OTHER PUBLICATIONS

PCT International Application No. PCT/KR2016/002172 International Search Report dated Jun. 29, 2016, 4 pages.
(Continued)

*Primary Examiner* — Duc T Duong
(74) *Attorney, Agent, or Firm* — Lee, Hong, Degerman, Kang & Waimey

(57) ABSTRACT

The disclosure of the present specification provides a method for receiving a downlink control channel, which is repeated on a plurality of downlink subframes, by a wireless device in a wireless communication system. The method may comprise the steps of: attempting, by the wireless device, blind decoding of the downlink control channel, using one or more of multiple scrambling codes; when the blind decoding is successful, determining, by the wireless device, a repetition level for the downlink control channel on the basis of a scrambling code by which the wireless device
(Continued)

has been successful in the blind decoding; and determining, by the wireless device, the number of repetitions of the downlink control channel according to the repetition level.

14 Claims, 27 Drawing Sheets

(51) Int. Cl.
  *H04L 1/00* (2006.01)
  *H04L 5/00* (2006.01)
  *H04W 4/70* (2018.01)

(56) References Cited

U.S. PATENT DOCUMENTS

2015/0341956 A1* 11/2015 Sun ................ H04L 1/0046
                                                          370/329
2016/0269163 A1*  9/2016 Wong ............. H04W 72/042
2017/0195102 A1*  7/2017 Xiong .............. H04L 1/18

OTHER PUBLICATIONS

Panasonic, "Consideration on Data Channel and Associated Control Channel for MTC," 3GPP TSG RAN WG1 Meeting #80, R1-150306, Athens, Greece, Feb. 2015, 5 pages.

ZTE, "Further Considerations on Physical Downlink Control Channel for MTC Enhancement," 3GPP TSG RAN WG1 Meeting #80, R1-150142, Athens, Greece, Feb. 2015, 6 pages.

Samsung, "Search Space Design and Transmission Timing for DL Control Signaling," 3GPP TSG RAN WG1 Meeting #80, R1-150348, Athens, Greece, Feb. 2015, 3 pages.

* cited by examiner

FIG. 6
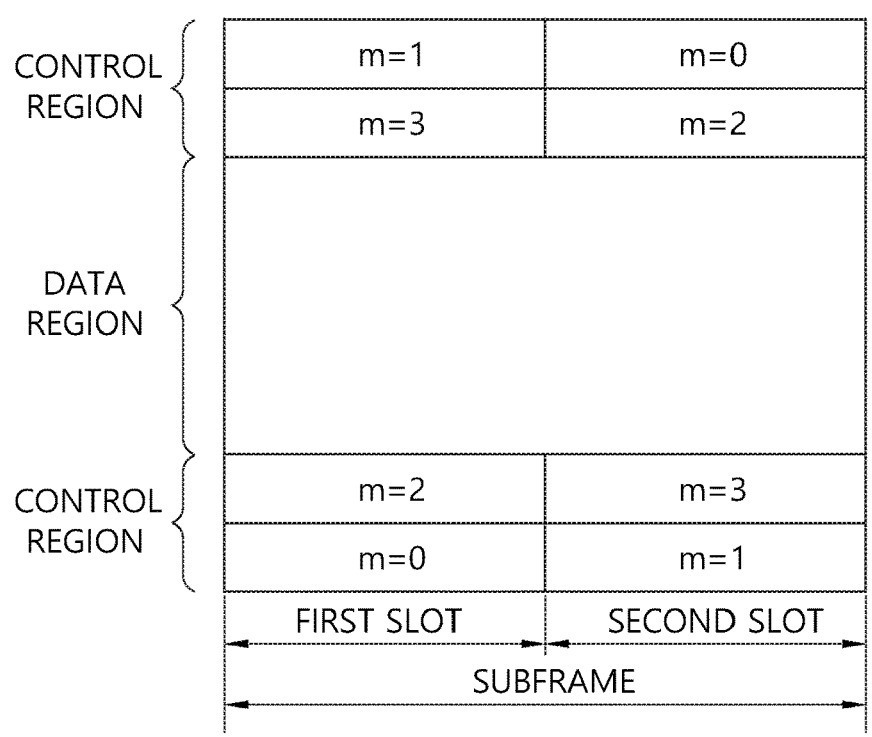
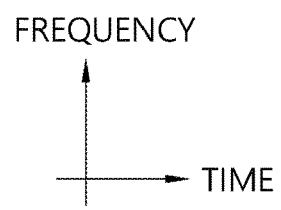

FIG. 20

| ECCE 0 |
| ECCE 1 |
| ECCE 2 |
| ECCE 3 |
| ECCE 4 |
| ECCE 5 |
| ECCE 6 |
| ECCE 7 |

(a)

| ECCE 0 |
| ECCE 1 |
| ECCE 2 |
| ECCE 3 |
| ECCE 4 |
| ECCE 5 |
| ECCE 6 |
| ECCE 7 |

(b)

| ECCE 0 |
| ECCE 1 |
| ECCE 2 |
| ECCE 3 |
| ECCE 4 |
| ECCE 5 |
| ECCE 6 |
| ECCE 7 |

(c)

METHOD AND WIRELESS DEVICE FOR RECEIVING DOWNLINK CONTROL CHANNEL

CROSS-REFERENCE TO RELATED APPLICATIONS

This application is the National Stage filing under 35 U.S.C. 371 of International Application No. PCT/KR2016/002172, filed on Mar. 4, 2016, which claims the benefit of U.S. Provisional Application Ser. Nos. 62/154,664, filed on Apr. 29, 2015 and 62/128,972, filed on Mar. 5, 2015, the contents of which are all incorporated by reference herein in their entirety.

BACKGROUND OF THE INVENTION

Field of the Invention

The present invention relates to mobile communication.

Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

As disclosed in 3GPP TS 36.211 V10.4.0 (2011-12) "Evolved Universal Terrestrial Radio Access (E-UTRA); Physical Channels and Modulation (Release 10)", a physical channel of LTE may be classified into a downlink channel, i.e., a PDSCH (Physical Downlink Shared Channel) and a PDCCH (Physical Downlink Control Channel), and an uplink channel, i.e., a PUSCH (Physical Uplink Shared Channel) and a PUCCH (Physical Uplink Control Channel).

Meanwhile, in recent years, research into communication between devices or the device and a server without human interaction, that is, without human intervention, that is, machine-type communication (MTC) has been actively conducted. The MTC represents a concept in which not a terminal used by human but a machine performs communication by using the existing wireless communication network.

Since MTC has features different from communication of a normal UE, a service optimized to MTC may differ from a service optimized to human-to-human communication. In comparison with a current mobile network communication service, MTC can be characterized as a different market scenario, data communication, less costs and efforts, a potentially great number of MTC devices, wide service areas, low traffic for each MTC device, etc.

Meanwhile, recently, extension or enhancement of cell coverage of a base station (BS) for MTC devices has been considered. However, when an MTC device is placed in a coverage extension (CE) or a coverage enhancement (CE) area, a downlink channel may not be properly received. To this end, the BS may consider to repeatedly transmit the same downlink channels on a plurality of subframes.

However, if the MTC device cannot identify the number of repetitions of downlink control channel repeated on a plurality of subframes, the MTC device cannot properly receive a downlink data channel, or the like.

SUMMARY OF THE INVENTION

Accordingly, a disclosure of the present specification has been made in an effort to solve the aforementioned problem.

In an aspect, a method for receiving a downlink control channel, which is repeated on a plurality of downlink subframes, by a wireless device in a wireless communication system is provided, The method includes: performing, by the wireless device, a blind decoding on the downlink control channel, using one or more of multiple scrambling codes; when the blind decoding is successful, determining, by the wireless device, a repetition level for the downlink control channel on the basis of the scrambling code by which the blind decoding was successful; and determining, by the wireless device, the number of repetitions of the downlink control channel according to the repetition level.

The scrambling code by which the blind decoding was successful may be determined according to the number of repetitions of the downlink control channel transmitted on the plurality of downlink subframes.

The scrambling code by which the blind decoding was successful may be determined according to an index of a downlink subframe in which repeated transmission of the downlink control channel is terminated, among the plurality of downlink subframes.

A demodulation reference signal (DMRS) for decoding the downlink control channel may be decoded by the scrambling code by which the blind decoding was successful.

The method may further include: determining a position of a subframe in which transmission of a downlink data channel is to start, on the basis of the determined repetition level. f The method may further include: identifying a transmission resource of a hybrid automatic repeat request (HARQ) acknowledgement (ACK) on the basis of the determined repetition level.

The method may further include: determining the number of repeatedly transmitting an uplink control channel or an uplink data channel on the basis of the determined repetition level.

In another aspect, a wireless device for receiving a downlink control channel which is repeated on a plurality of downlink subframes is provided. The wireless device includes: a transceiver unit; and a processor controlling the transceiver unit. The processor may perform a procedure of performing a blind decoding on the downlink control channel using one or more of a plurality of scrambling codes; when the blind decoding is successful, determining a repetition level for the downlink control channel on the basis of the scrambling code by which the blind decoding was successful; and determining the number of repetitions of the downlink control channel according to the repetition level.

According to the disclosure of the present specification, the problems of the above-described prior art are solved.

BRIEF DESCRIPTION OF THE DRAWINGS

FIG. 6. illustrates a structure of an uplink subframe in 3GPP LTE.

FIG. 20 illustrates a method for transmitting an M-PDCCH according to an embodiment of the present invention.

DESCRIPTION OF EXEMPLARY EMBODIMENTS

Figure 1:
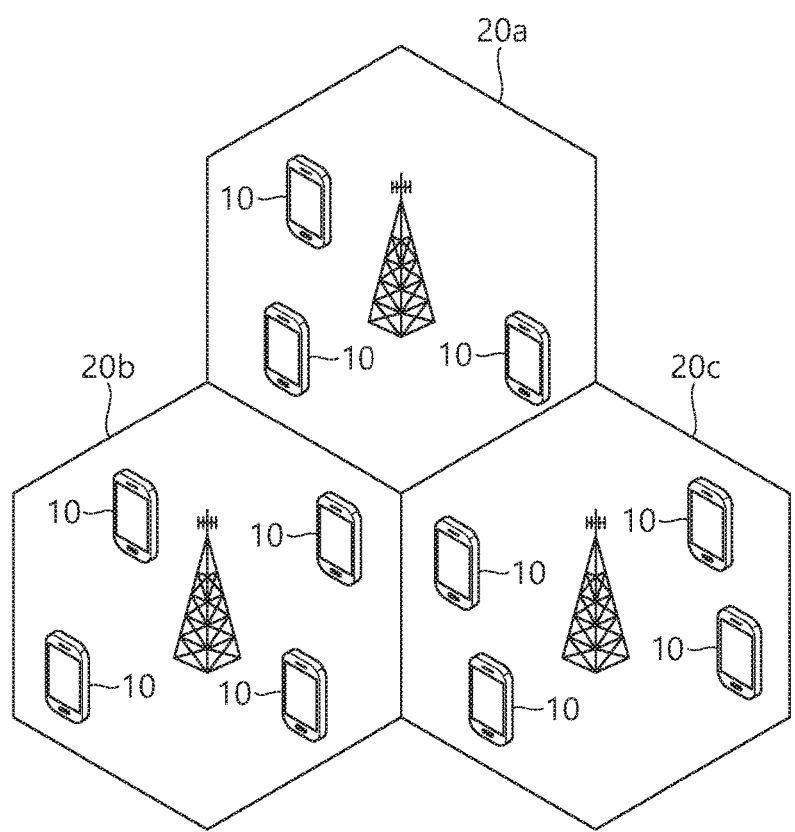
FIG. 1 is a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
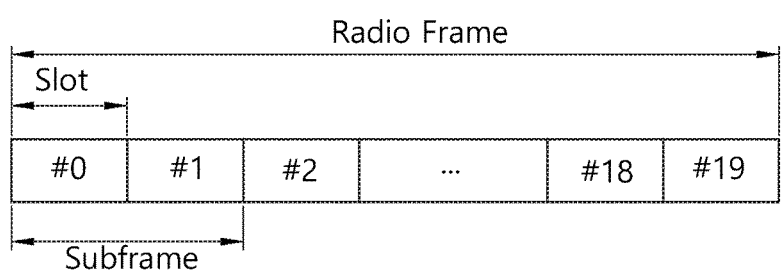
FIG. 2 illustrates a structure of a radio frame according to FDD in 3GPP LTE.

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

TABLE 2

| | Normal CP in downlink | | | Extended CP in downlink | | |
|---|---|---|---|---|---|---|
| | | UpPTS | | | UpPTS | |
| Special subframe configuration | DwPTS | Normal CP in uplink | Extended CP in uplink | DwPTS | Normal CP in uplink | Extended CP in uplink |
| 0 | 6592 * Ts | 2192 * Ts | 2560 * Ts | 7680 * Ts | 2192 * Ts | 2560 * Ts |
| 1 | 19760 * Ts | | | 20480 * Ts | | |
| 2 | 21952 * Ts | | | 23040 * Ts | | |
| 3 | 24144 * Ts | | | 25600 * Ts | | |
| 4 | 26336 * Ts | | | 7680 * Ts | 4384 * Ts | 5120 * ts |
| 5 | 6592 * Ts | 4384 * Ts | 5120 * ts | 20480 * Ts | | |
| 6 | 19760 * Ts | | | 23040 * Ts | | |
| 7 | 21952 * Ts | | | — | | |
| 8 | 24144 * Ts | | | — | | |

Meanwhile, one slot may include a plurality of OFDM symbols. The number of OFDM symbols included in one slot may vary depending on a cyclic prefix (CP).

Figure 3:
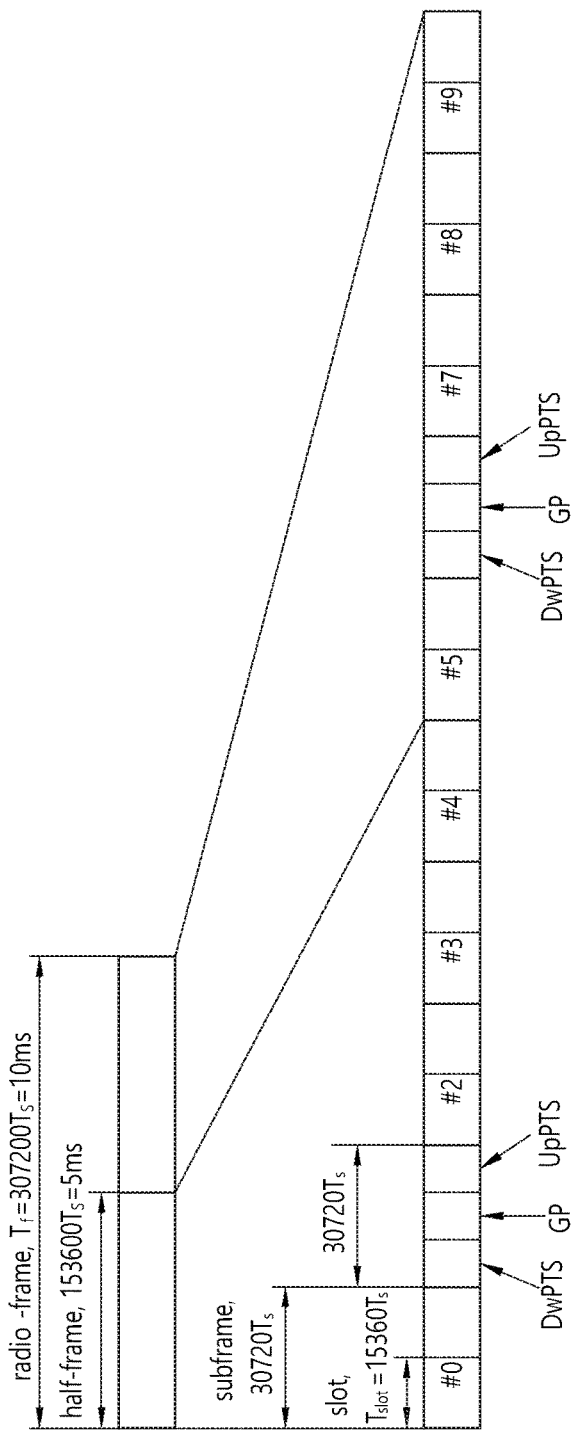
FIG. 3 illustrates a structure of a downlink radio frame according to TDD in the 3GPP LTE.

FIG. 3 illustrates the architecture of a downlink radio frame according to TDD in 3GPP LTE.

For this, 3GPP TS 36.211 V10.4.0 (2011-23) "Evolved Universal Terrestrial Radio Access (E-UTRA); Physical Channels and Modulation (Release 8)", Ch. 4 may be referenced, and this is for TDD (time division duplex).

Figure 4:
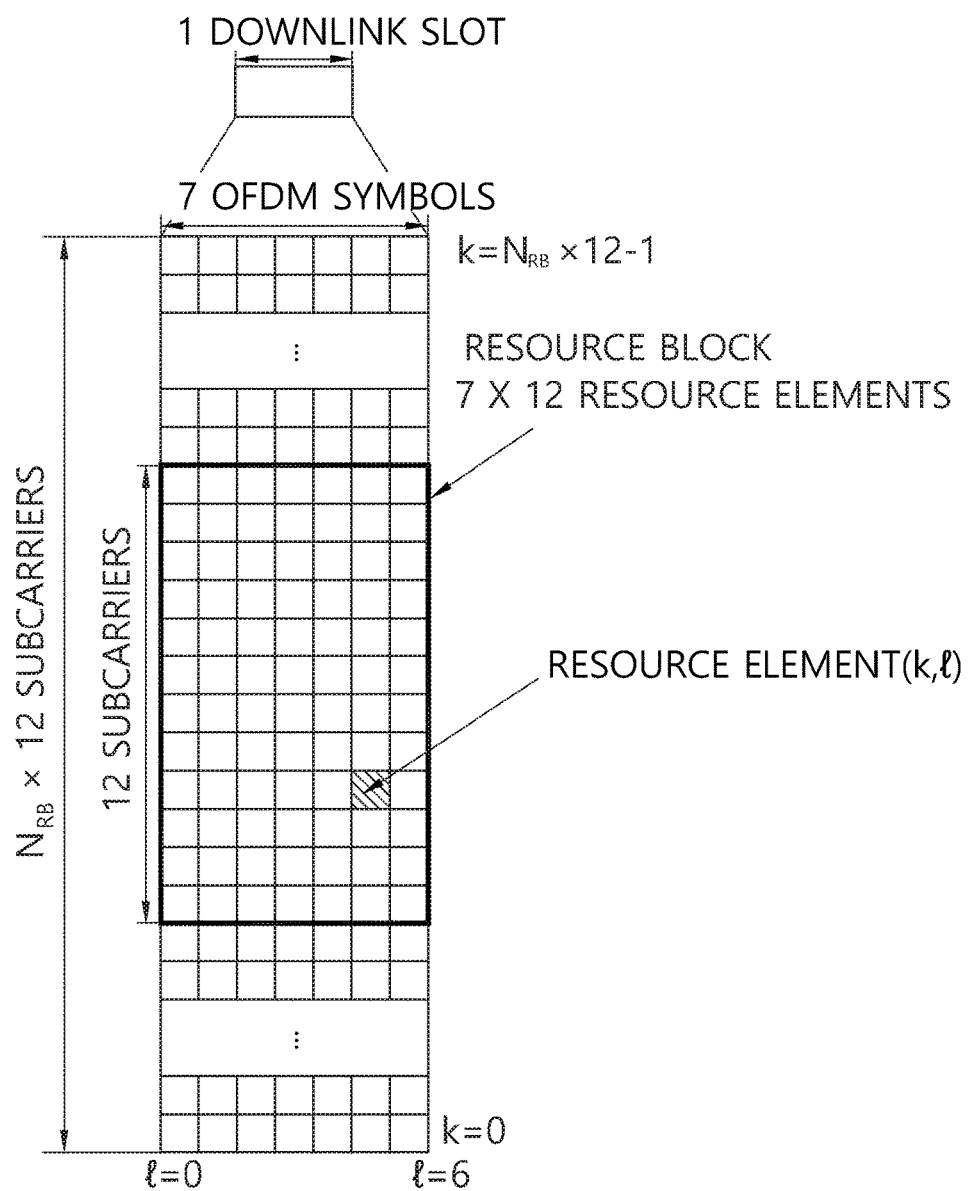
FIG. 4 is an exemplary diagram illustrating a resource grid for one uplink or downlink slot in the 3GPP LTE.

Sub-frames having index #1 and index #6 are denoted special sub-frames, and include a DwPTS (Downlink Pilot FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 subcarriers in the frequency domain, one resource block may include 7×12 resource elements (REs).

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
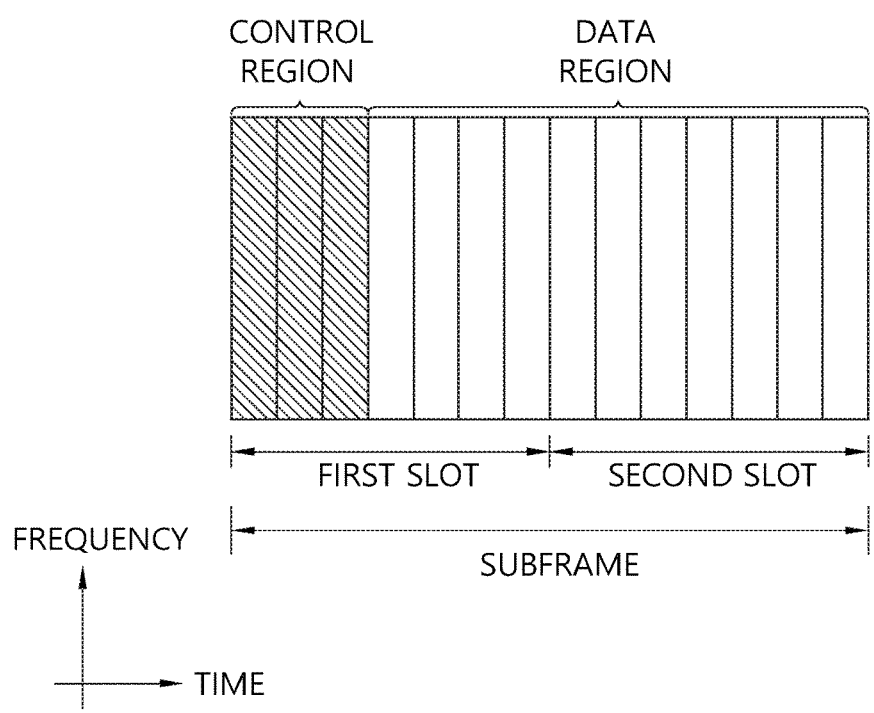
FIG. 5 illustrates a structure of a downlink subframe.

FIG. 5 illustrates the architecture of a downlink subframe.

In FIG. 5, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

FIG. 6. illustrates a structure of an uplink subframe in 3GPP LTE.

Referring to FIG. 6, an uplink subframe may be divided into a control region and a data region in a frequency domain. The control region is allocated a PUCCH for transmission of uplink control information. The data region is allocated a PUSCH for transmission of data (along with control information in some cases).

A PUCCH for one UE is allocated a RB pair in a subframe. RBs in the RB pair take up different subcarriers in each of first and second slots. A frequency occupied by the RBs in the RB pair allocated to the PUCCH changes with respect to a slot boundary, which is described as the RB pair allocated to the PUCCH having been frequency-hopped on the slot boundary.

A UE transmits uplink control information through different subcarriers according to time, thereby obtaining a frequency diversity gain. m is a location index indicating the logical frequency-domain location of an RB pair allocated for a PUCCH in a subframe.

Uplink control information transmitted on a PUCCH may include a HARQ ACK/NACK, a channel quality indicator (CQI) indicating the state of a downlink channel, a scheduling request (SR) which is an uplink radio resource allocation request, or the like.

A PUSCH is mapped to a uplink shared channel (UL-SCH) as a transport channel Uplink data transmitted on a PUSCH may be a transport block as a data block for a UL-SCH transmitted during a TTI. The transport block may be user information. Alternatively, the uplink data may be multiplexed data. The multiplexed data may be the transport block for the UL-SCH multiplexed with control information. For example, control information multiplexed with data may include a CQI, a precoding matrix indicator (PMI), an HARQ, a rank indicator (RI), or the like. Alternatively, the uplink data may include only control information.

<Carrier Aggregation>

Hereinafter, a carrier aggregation (CA) system will be described.

The carrier aggregation (CA) system means aggregating multiple component carriers (CCs). By the carrier aggregation, the existing meaning of the cell is changed. According to the carrier aggregation, the cell may mean a combination of a downlink component carrier and an uplink component carrier or a single downlink component carrier.

Further, in the carrier aggregation, the cell may be divided into a primary cell, secondary cell, and a serving cell. The primary cell means a cell that operates at a primary frequency and means a cell in which the UE performs an initial connection establishment procedure or a connection reestablishment procedure with the base station or a cell indicated by the primary cell during a handover procedure. The secondary cell means a cell that operates at a secondary frequency and once an RRC connection is established, the secondary cell is configured and is used to provide an additional radio resource.

As described above, the carrier aggregation system may support a plurality of component carriers (CC), that is, a plurality of serving cells unlike a single carrier system.

The carrier aggregation system may support cross-carrier scheduling. The cross-carrier scheduling is a scheduling method that may perform resource allocation of the PDSCH transmitted through another component carrier through the PDCCH transmitted through a specific component carrier and/or resource allocation of the PUSCH transmitted through other component carrier other than the component carrier fundamentally linked with the specific component carrier.

<EPDCCH (Enhanced Physical Downlink Control Channel)>

Meanwhile, a PDCCH is monitored in a limited region called a control region within a subframe, and a CRS transmitted in the entire band is used for demodulation of the PDCCH. As types of control information are diversified and an amount of control information is increased, flexibility of scheduling only with the existing PDCCH is lowered. Also, in order to reduce a burden due to CRS transmission, an enhanced PDCCH (EPDCCH) has been introduced.

Figure 7:
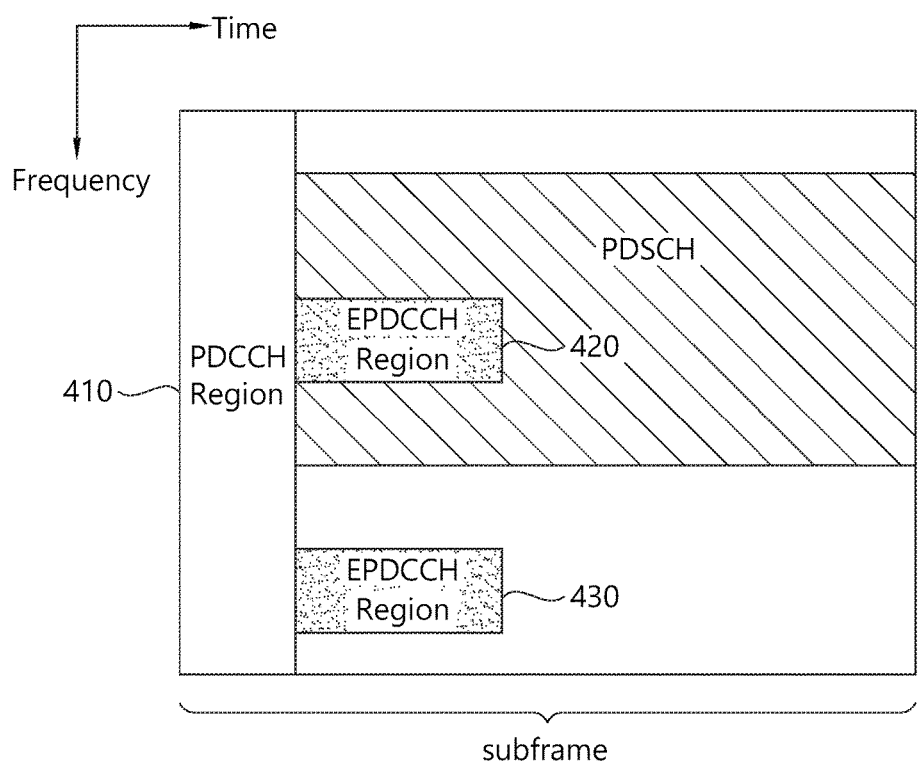
FIG. 7 illustrates an example of a subframe having an EPDCCH.

FIG. 7 illustrates an example of a subframe having an EPDCCH.

A subframe may include zero or one PDCCH region 4100 and zero or more PEDCCH regions 420 and 430

The PEDCCH regions 420 and 430 are regions in which a wireless device monitors an EPDCCH. The PDCCH region 410 is positioned within a maximum of four preceding OFDM symbols, while the EPDCCH regions 420 and 430 may be flexibly scheduled in subsequent OFDM symbols after the PECCH region 410.

One or more EPDCCH regions 420 and 430 are designated in a wireless device, and the wireless device may monitor an EPDCCH in the designated EPDCCH regions 420 and 430.

The number/position/size of the EPDCCH regions 420 and 430 and/or information regarding a subframe for monitoring the PEDCCH may be provided by a BS to the wireless device through an RRC message, or the like.

In the PDCCH region 410, a PDCCH may be demodulated on the basis of a CRS. In the EPDCCH regions 420 and 430, a demodulation (DM) RS, rather than a CRS, may be defined to demodulate an EPDCCH. An associated DM RS may be transmitted in the EPDCCH regions 420 and 430.

Each of the EPDCCH regions 420 and 430 may be used to perform scheduling on different cells. For example, an EPDCCH within the EPDCCH region 420 may carry scheduling information for a primary cell and an EPDCCH within the EPDCCH region 430 may carry scheduling information for a secondary cell.

When an EPDCCH is transmitted in the EPDCCH regions 420 and 430 through multiple antennas, the same precoding as that of an DPCCH may be applied to a DM RS within the EPDCCH regions 420 and 430.

Compared with a PDCCH which uses a CCE as a transmission resource unit, a transmission resource unit for an EPDCCH is called an enhanced control channel element (ECCE). An aggregation level (AL) may be defined by a resource unit for monitoring an EEPDCCH. For example, when 1 ECCE is a minimum resource for an EPDCCH, an AL may be defined as AL={1, 2, 4, 8, 16}.

Hereinafter, an EPDCCH search space may correspond to an EPDCCH region. In the EPDCCH search space, one or more EPDCCH candidates may be monitored in one or more ALs.

Hereinafter, resource allocation for an EPDCCH will be described.

The EPDCCH is transmitted using one or more ECCEs. Each ECCE includes a plurality of enhanced resource element groups (EREEGs). An ECCH may include four eight EREGs according to a CP and a subframe type according to time division duplex (TDD) DL-UL. For example, in a normal CP, the ECCE may include 4 EREGs, and in an extended CP, the ECCE may include 8 EREGs.

A physical resource block (PRB) pair refers to two PRBs having the same RB number in one subframe. The PRB pair refers to a first PRB of a first slot and a second PRB of a second slot. In a normal CP, a PRB pair includes 12 subcarriers and 14 OFDM symbols, and thus, the PRB pair includes 168 source elements (REs).

The EPDCCH search space may be set as one or a plurality of PRB pairs. One PRB pair includes 16 EREGs. Thus, when an ECCE includes 4 EREGs, a PRB pair includes four ECCEs, and when an ECCE includes 8 EREGs, a PRB pair includes two ECCEs.

Figure 8:
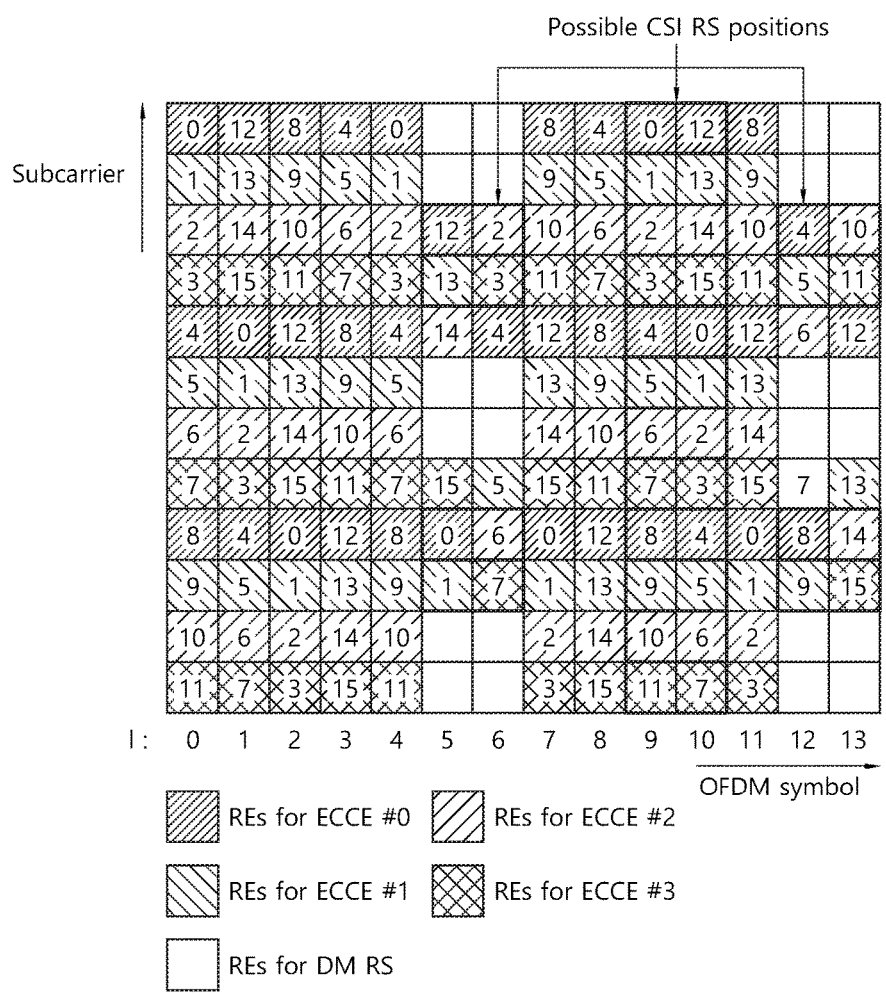
FIG. 8 illustrates an example of a PRB pair in one subframe.

FIG. 8 illustrates an example of a PRB pair in one subframe.

Hereinafter, it is assumed that a subframe includes two slots and a PRB pair includes 7 OFDM symbols and 12 subcarriers in one slot, the number of OFDM symbols and the number of subcarriers are merely an example.

In one subframe, a PRB pair includes 168 REs Thus, 1 EREG may include 9 REs. However, in one PRB pair, a CSI-RS or CRS may be disposed in addition to a DM RM. Here, the number of available REs may be reduced and the number of REs included in 1 EREG may be reduced. Although the number of REs included in an EREG may be reduced but the number of EREGs included in one PRB pair, i.e., 16, is not changed.

Here, as illustrated in FIG. 8, for example, REs may be sequentially indexed, starting from an upper first subcarrier of a left first OFDM symbol (1=0) (or REs may be sequentially indexed in an upward direction, starting from a lower first subcarrier of a left first OFDM symbol (1=0)). Here, it is assumed that 16 EREGs are indexed from 0 to 15. Here, 9 REs having an RE index 0 are allocated to EREG 0. Similarly, 9 REs corresponding to an RE index k (k= 0, . . . , 15) are allocated to EREG k.

A plurality of EREGs are grouped to define an EREG group. For example, when an EREG group having four EREGs is defined, it may be defined such that EREG group #0={EREG 0, EREG 4, EREG 8, EREG 12}, EREG group #1={EREG 1, EREG 5, EREG 9, EREG 3}, EREG group #2={EREG 2, EREG 6, EREG 10, EREG 14}, and EREG group #3={EREG 3, EREG 7, EREG 11, EREG 15}. When en EREG group having 8 EREGs is defined, it may be defined such that EREG group #0={EREG 0, EREG 2, EREG 4, EREG 6, EREG 8, EREG 10, EREG 12, EREG 14} and EREG group #1={EREG 1, EREG 3, EREG 5, EREG 7, EREG 9, EREG 11, EREG 13, EREG 15}.

As described above, an ECCE includes 4 EREGs, and an ECCE may include 8 EREGs in an extended CP. An ECCE is defined by an EREG group. For example, FIG. 6 illustrates that ECCE #0 includes EREG group #0, ECCE #1 includes EREG group #1, ECCE #2 includes EREG group #2, and ECCE #3 includes EREG group #3.

ECCE-to-EREG mapping includes localized transmission and distributed transmission. In localized transmission, an EREG group forming one ECCE is selected from an EREG of one PRB pair. In distributed transmission, an EREG group forming one ECCE is selected from EREGs of different PRB pairs.

Unlike a PDCCH demodulated on the basis of a CRS to obtain a precoding gain, an EPDCCH is demodulated on the basis of a demodulation reference signal (DMRS).

Figure 9:
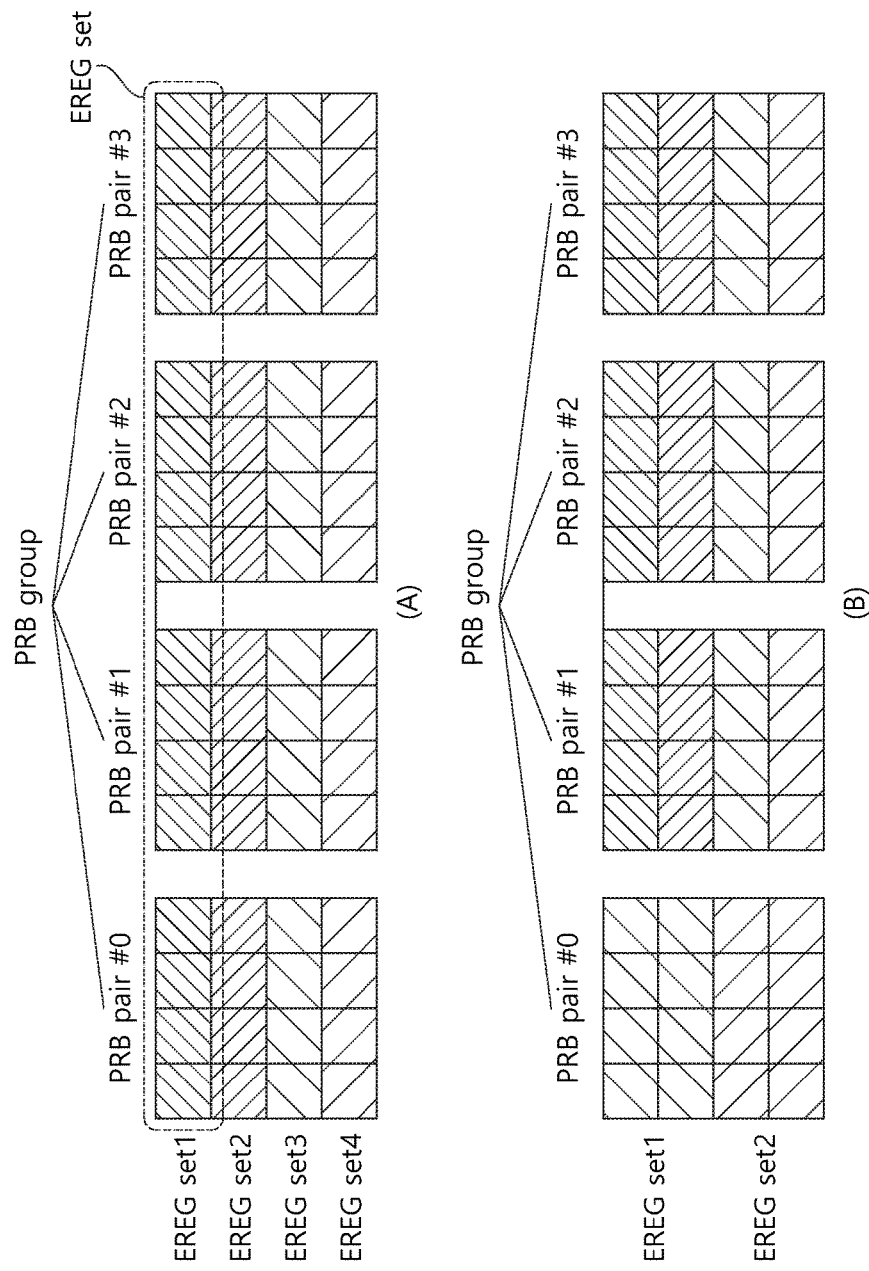
FIG. 9 illustrates an example of a PRB pair structure.

FIG. 9 illustrates an example of a PRB pair structure.

A PRB group includes four PRB pairs, but the number thereof is not limited thereto.

(A) of FIG. 9 illustrates an EREG set when an ECCE includes 4 EREGs, and (B) of FIG. 9 illustrates an EREG set when an ECCE includes 8 EREGs.

Hereinafter, it is assumed that one ECCE includes 4 EREGs unless otherwise mentioned.

An EPDCCH supports localized transmission and distributed transmission. In localized transmission, an EREG forming one ECCE is transmitted in one PRB pair. In distributed transmission, an EREG forming one ECCE is transmitted in a plurality of PRB pairs.

Figure 10:
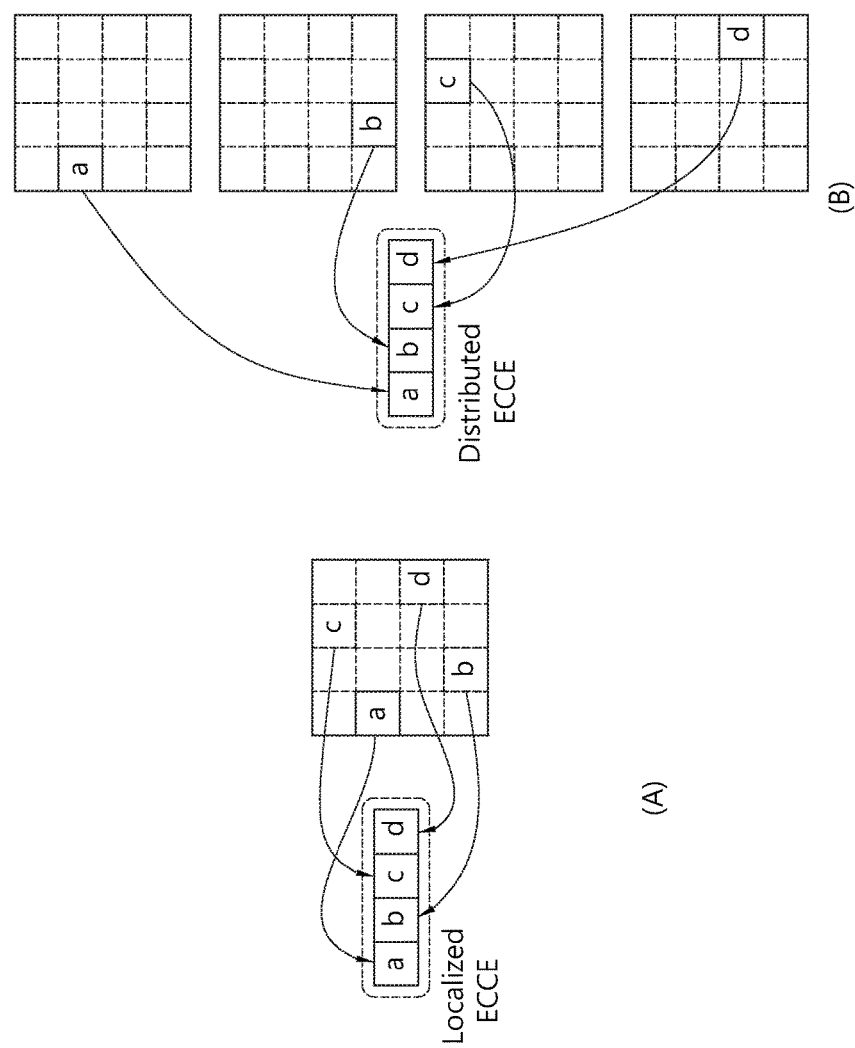
FIG. 10 illustrates an example of local transmission and distributed transmission.

FIG. 10 illustrates an example of localized transmission and distributed transmission.

(A) of FIG. 10 illustrates an example of ECCE-to-EREG mapping according to localized transmission. A local ECCE refers to an ECCE used in localized transmission. (B) of FIG. 10 illustrates an example of ECCE-to-EREG mapping according to distributed transmission. A distributed ECCE refers to an ECCE used in distributed transmission.

An EREG set refers to a set of EREGs used to form a localized ECCE or distributed ECCE. That is, the ECCE may include EREGs belonging to the same EREG set.

<Synchronization Signal>

Meanwhile, in the LTE/LTE-A system, synchronization with a cell is obtained through a synchronization signal (SS) in a cell search procedure.

Hereinafter, a synchronization signal will be described in detail with reference to the accompanying drawings.

Figure 11A:
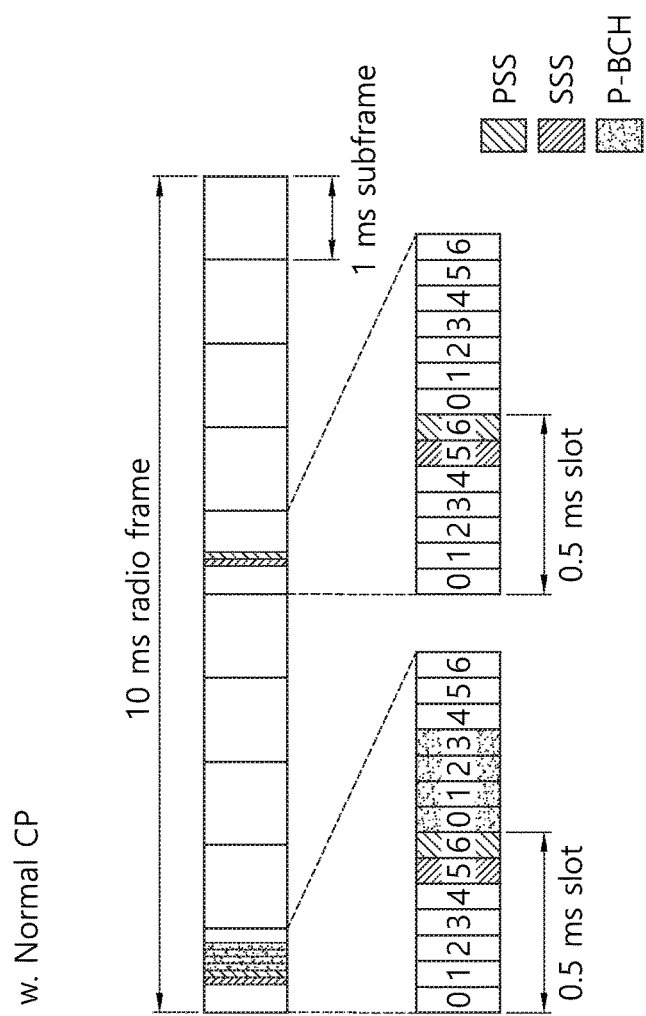
FIGS. 11A and 11B illustrate frame structures for synchronization signal transmission in a normal CP and extended CP, respectively.
Figure 11B:
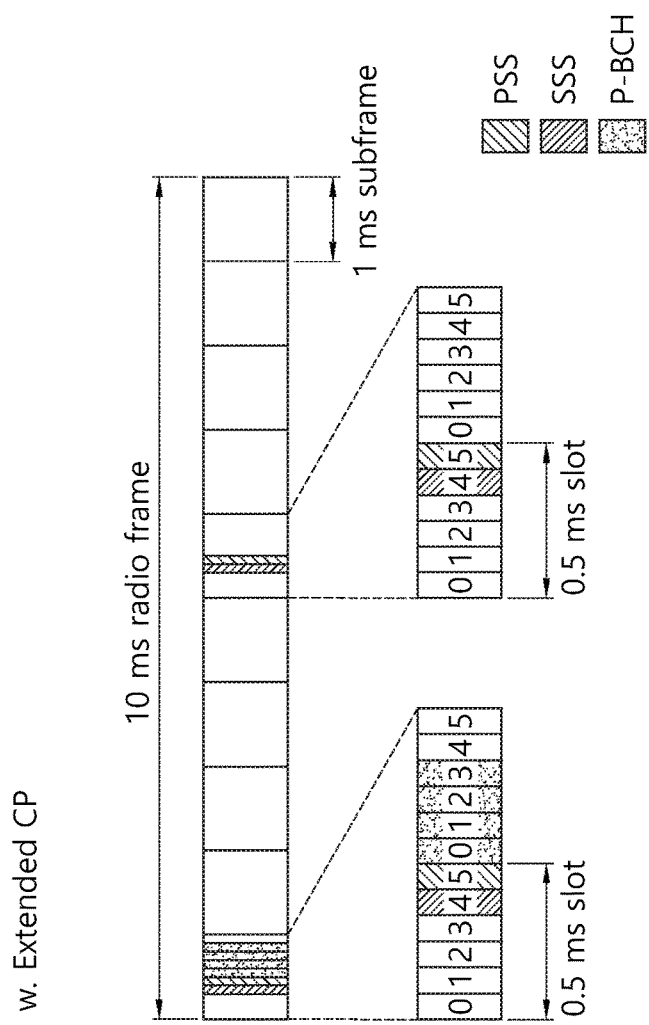

FIGS. 11A and 11B illustrate frame structures for transmitting a synchronization signal in a normal CP and an extended CP, respectively.

Referring to FIGS. 11A and 11B, a synchronization signal (SS) is transmitted in each of second slots of a subframe 0# and a subframe #5 in consideration of 4.6 ms of the length of a GSM frame to facilitate inter-RAT measurement, and a boundary regarding the corresponding radio frame may be detected through a secondary synchronization signal (S-SS).

A primary synchronization signal (P-SS) is transmitted in a final OFDM symbol of a corresponding slot, and an S-SS is transmitted in an OFDM symbol immediately in front of the P-SS.

The synchronization signal (SS) may transmit a total of 504 physical cell IDs through combination of 3 P-SSs and 168 S-SSs.

Also, an SS and a physical broadcast channel (PBCH) are transmitted within middle 6 RBs within a system bandwidth so that a user equipment (UE) may detect or decode the same, regardless of a transmission bandwidth.

<Machine Type Communication (MTC)>

Meanwhile, hereinafter, the MTC will be described.

Figure 12A:
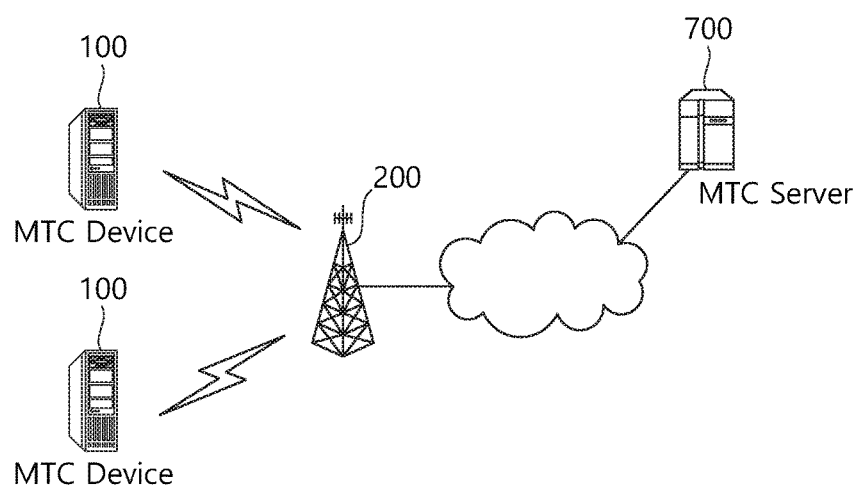
FIG. 12A illustrates an example of machine type communication (MTC).

FIG. 12a illustrates an example of the machine type communication (MTC).

The machine type communication (MTC) represents information exchange through between MTC devices 100 through a base station 200 or information exchange between the MTC device 100 and an MTC server 700 through the base station, which does not accompany human interaction.

The MTC server 700 is an entity which communicates with the MTC device 100. The MTC server 700 executes an MTC application and provides an MTC specific service to the MTC device.

The MTC device 100 as a wireless device providing the MTC may be fixed or mobile.

The service provided through the MTC has discrimination from a service in communication in which human intervenes in the related art and includes various categories of services including tracking, metering, payment, a medical field service, remote control, and the like. In more detail, the service provided through the MTC may include electric meter reading, water level measurement, utilization of a monitoring camera, reporting of an inventory of a vending machine, and the like.

As peculiarities of the MTC device, since a transmission data amount is small and uplink/downlink data transmission/reception often occurs, it is efficient to decrease manufacturing cost of the MTC device and reduce battery consumption according to the low data transmission rate. The MTC device is characterized in that mobility is small, and as a result, the MTC device is characterized in that a channel environment is not almost changed.

Meanwhile, the MTC is also called Internet of Things (IoT). Accordingly, the MTC device may be called an IoT device.

Figure 12B:
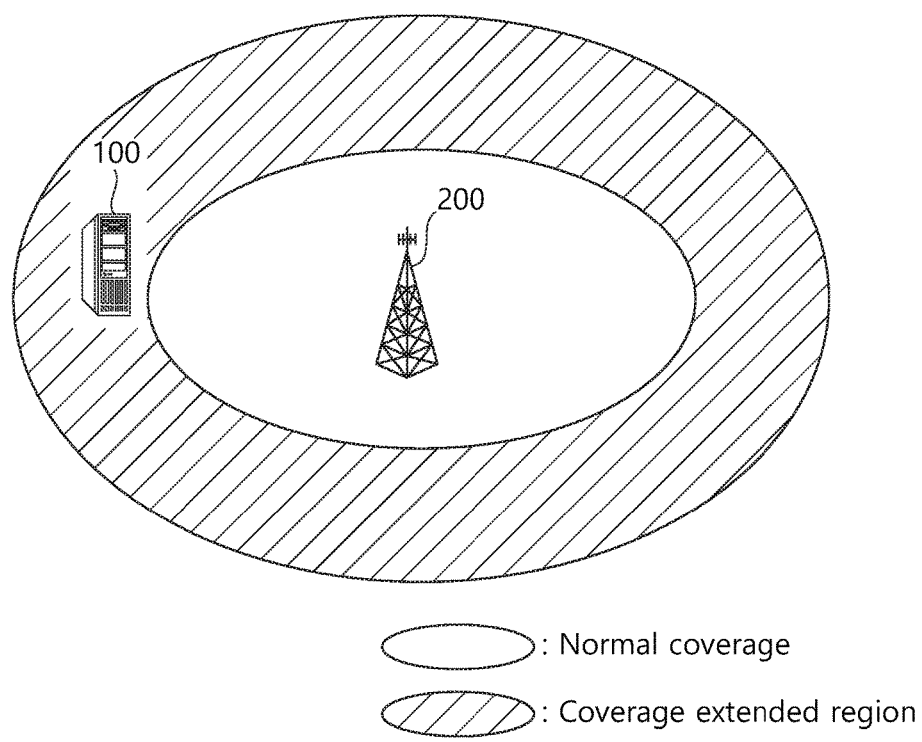
FIG. 12B illustrates extension or enhancement of cell coverage for an MTC device.

FIG. 12b illustrates an example of cell coverage extension for an MTC device.

In recent years, it is considered that cell coverage of the base station extends for the MTC device 100 and various techniques for the cell coverage extension are discussed.

However, in the case where the coverage of the cell extends, when the base station transmits a downlink channel to the MTC device positioned in the coverage extension area, the MTC device undergoes a difficulty in receiving the downlink channel.

Figure 13A:
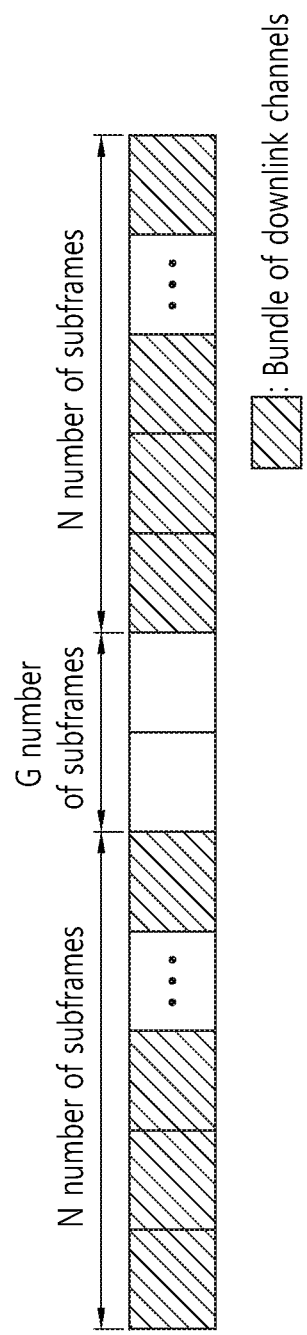
FIG. 13A illustrates an example of transmitting a bundle of downlink channels.

FIG. 13a is an exemplary diagram illustrating an example of transmitting a bundle of downlink channels.

As known with reference to FIG. 13a, the base station repeatedly transmits he downlink channel (for example, the PDCCH and/or PDSCH) to the MTC device positioned in the coverage extension area on multiple subframes (for example, N subframes). As described above, the downlink channels which are repeated on the multiple subframes are called a bundle of the downlink channels.

Meanwhile, the MTC device receives the bundle of the downlink channels on the multiple subframes and decodes a part or the entirety of the bundle to increase decoding success rate.

Figure 13B:
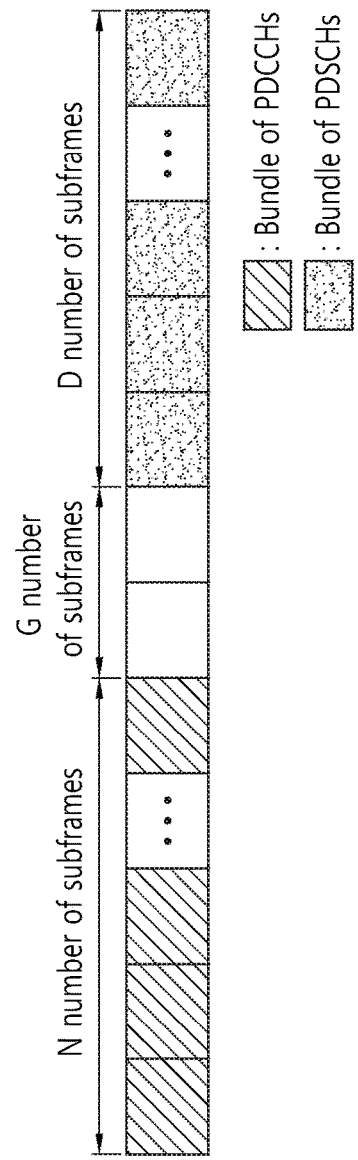
FIG. 13B illustrates an example of transmitting a bundle of PDCCHs and a bundle of PDSCHs.

FIG. 13B illustrates an example of transmission of a bundle of PDCCHs and a bundle of PDSCHs.

Referring to FIG. 13B, a BS may transmit a bundle of the same repeated PDCCHs on a plurality of (e.g., N number of) subframes to an MTC device positioned in a coverage extended area. Also, the BS may transmit a bundle of the same repeated PDSCHs on a plurality of (e.g., D number of) subframes. Here, the bundle of PDSCHs may be transmitted after a predetermined gap, e.g., after G number of subframes, after the bundle of PDSCHs is transmitted. That is, for example, in cases where transmission of the bundle of PDSCHs is finished on (N−1)th subframe, the bundle of PDSCHs may be transmitted on the D number of subframes, starting from (N+G)th subframe.

Meanwhile, similarly the MTC device positioned in the coverage extended area may also transmit a bundle of uplink channels (e.g., PUSCHs and/or PUSCHs) on several subframes to the BS.

Figure 14A:
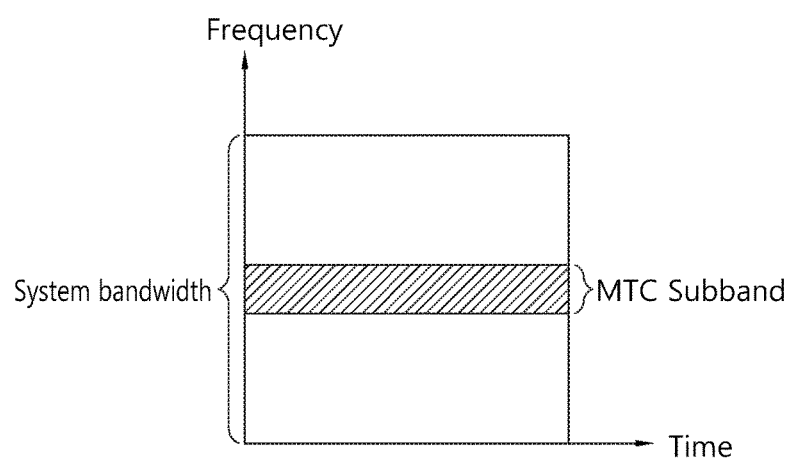
FIGS. 14A and 14B illustrate an example of a subband in which an MTC device operates.
Figure 14B:
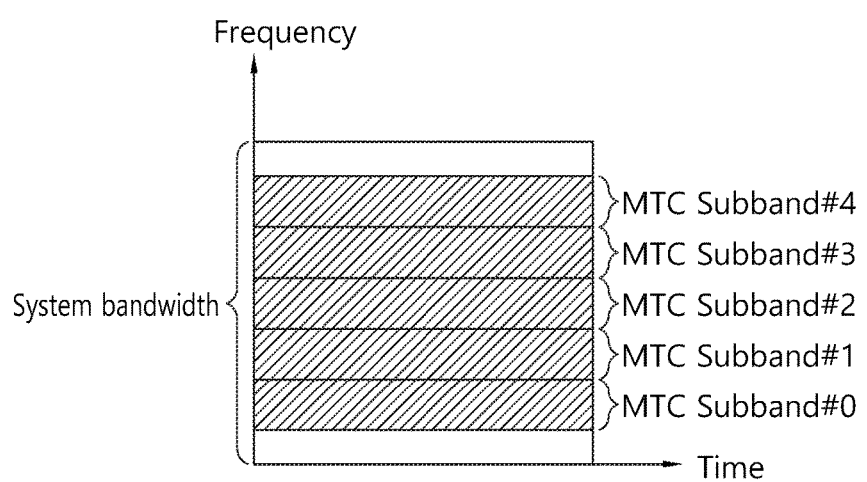

FIGS. 14A and 14B illustrate an example of a subband in which an MTC device operates.

In order to reduce cost of an MTC device, the MTC device may use a subband of about 1.4 MHz, for example, regardless of system bandwidth of a cell as illustrated in FIG. 14A.

Here, a region of a subband in which the MTC device operates may be positioned in a central region (e.g., six middle Ps) of a system bandwidth of the cell as illustrated in FIG. 14A.

Or, as illustrated in FIG. 14B, for multiplexing within a subframe between MTC devices, several subbands of an MTC device are provided in one subframe to use different subbands between the MTC devices. Here, most MTC devices may use a subband other than the central region (e.g., six middle PRBs) of a system band of the cell.

Meanwhile, the MTC device operating in the reduced some bands cannot properly receive an existing PDSCH transmitted from the BS on the entire system bands. Also, when multiplexing with a PDCCH transmitted to another general UE is considered, it may not be preferred for a cell to transmit a PDCCH for the MTC device in an existing OFDM symbol region in which the PDCCH is transmitted.

In order to solve this, a control channel for an MTC device transmitted within a subband in which the MTC device of low-complexity/low-specification/low-cost operates is required to be introduced.

Figure 15:
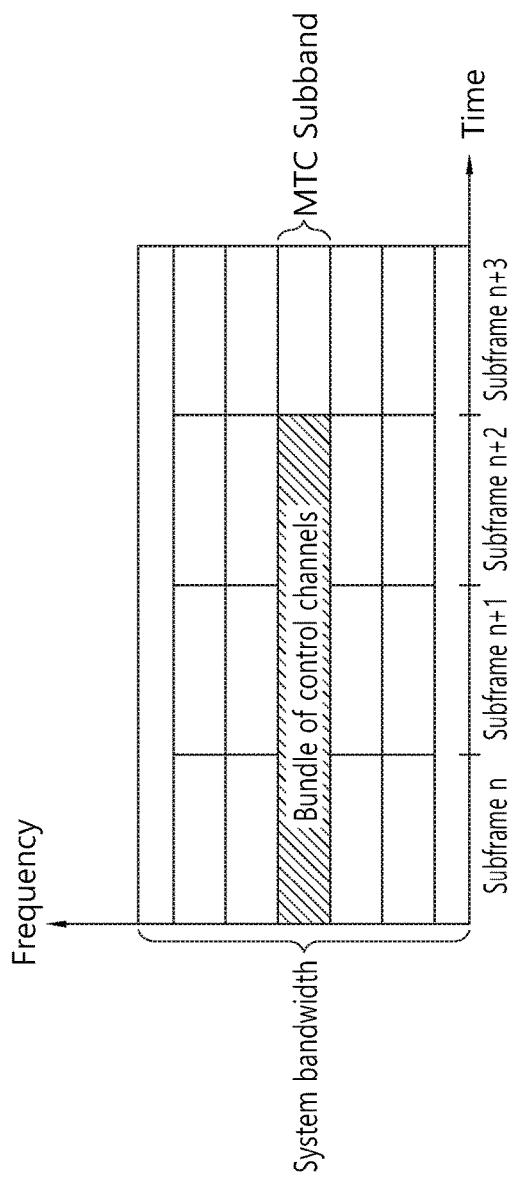
FIG. 15 illustrates an example of a control channel transmitted in a subband in which an MTC device operates.

FIG. 15 illustrates an example of a control channel transmitted within a subband in which an MTC device operates.

As can be seen with reference to FIG. 15, the MTC device operates in a certain MTC subband of a system bandwidth of the cell, rather than operating using the entire system bandwidths of the cell, the BS may transmit a control channel for the MTC device within the subband of the MTC. Such a control channel may be repeatedly transmitted on a plurality of subframes.

The control channel may be similar to an existing EPDCCH. That is, a control channel for the MTC device may be generated using an existing EPDCCH as is. Or, a control channel (or M-PDCCH) for the MTC device may be a form deformed from an existing PDCCH/EDPCCH.

Hereinafter, the control channel for the MTC device of low-complexity/low-specification/low-cost will be referred to as an MTC-EPDCCH or M-PDCCH. Such an MTC-EPDCCH or M-PDCCH may be used for an MTC device or may also be used for a UE of low-complexity/low-specification/low-cost or a UE positioned in a coverage extended or coverage enhanced area.

Figure 16A:
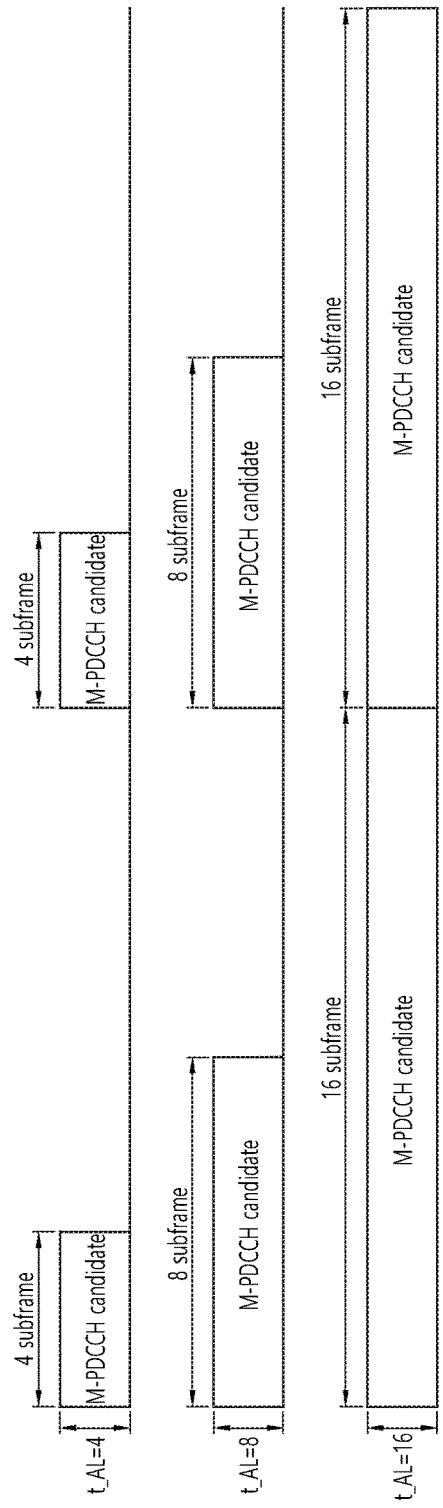
FIGS. 16A and 16B illustrate a transmission timing of candidates of an M-PDCCH.
Figure 16B:
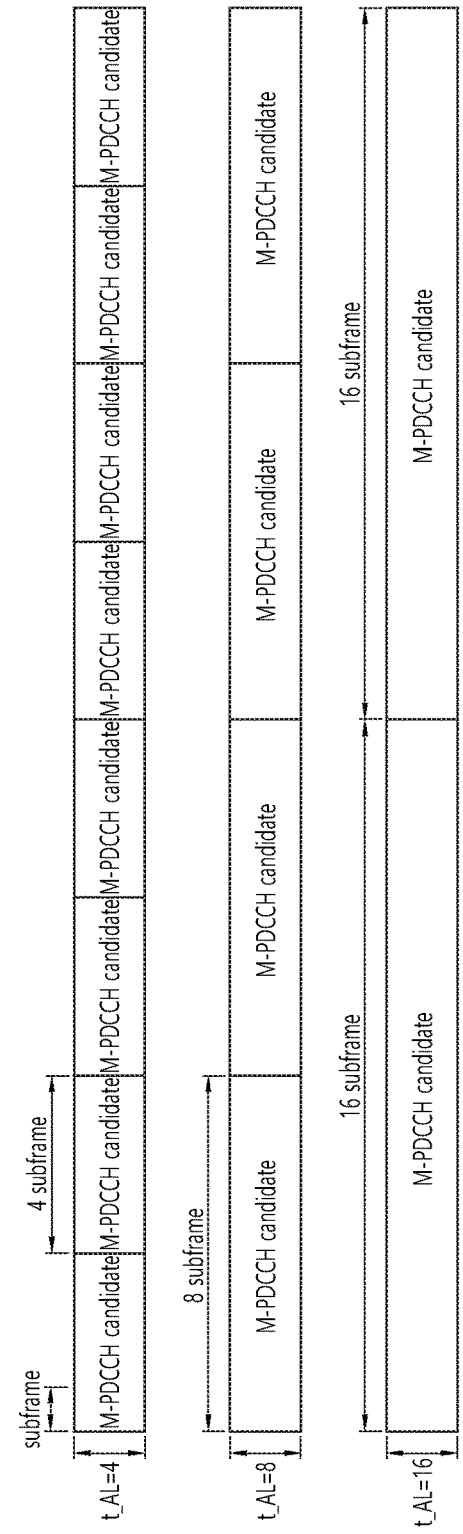

FIGS. 16A and 16B illustrate a transmission timing of M-PDCCH candidates.

For the MTC device of low-complexity/low-specification/low-cost operating within a band width reduced regardless of a system bandwidth, i.e., a subband, the M-PDCCH may be transmitted by utilizing every available resource within the subband. This may assist to reduce a time required for transmitting the M-PDCCH, i.e., latency and power consumption of the M-PDCCH, by using a maximum resource for transmission of the M-PDCCH within one subframe. In this case, the available resource may be a resource excluding resource used for transmitting another channel or a signal such as an existing resource for transmitting a PDCCH within a resource of six PRB, a resource for transmitting a primary synchronization signal (PSS)/secondary synchronization signal (SSS), a cell-specific reference signal (CRS), a DMRS, and/or channel state indicator-reference signal (CSI-RS). Or, the available resource may refer to a resource excluding a resource used for transmitting another channel or signal among RE resources in which the M-PDCCH may be transmitted.

In this case, for the MTC device of low-complexity/low-specification/low-cost (in particular, an MTC device positioned in the extended coverage area), transmission of an M-PDCCH using six PRBs within a subframe all the time may be considered. Such an M-PDCCH may have a form of a single AL within a subframe.

Meanwhile, in order to transmit the M-PDCCH such that the M-PDCCH is adaptive to a channel situation, the MTC device may monitor multiple repetition levels. Here, the repetition level may be replaced with the number of repetitions of the M-PDCCH, the number of subframes in which the M-PDCCH is transmitted, and the like. That is, candidates of the M-PDCCH monitored by the MTC device may have different repetition levels. For example, a repetition level of a candidate 0 of the M-PDCCH may be 4, a repetition level of a candidate 1 of the M-PDCCH is 8, and a repetition level of a candidate 2 of the M-PDCCH may be 16.

Hereinafter, for the purposes of description, the repetition level (in other words, the number of repetitions of the M-PDCCH or the number of subframes in which the M-PDCCH is transmitted) will be referred to as a time-domain aggregation level (AL) (t_AL).

As illustrated in FIG. 16A, transmission of M-PDCCH candidates regarding each t_AL may start at the same timing (in other words, the same transmission period or the same transmission offset). Also, as illustrated in FIG. 16B, transmission of M-PDCCH candidates regarding each t_AL may start from different transmission timings.

In this manner, when the M-PDCCH is used, resources forming the M-PDCCH are the same in different M-PDCCH candidates within one subframe. Thus, the MTC device may fail to determine to which t_AL an M-PDCCH received by the MTC device corresponds.

For example, as illustrated in FIG. 16A, when the MTC device simultaneously monitors three M-PDCCH candidates, starting from a subframe #0, the MTC device may perform decoding on a candidate whose t_AL is 4 in a subframe #3. Here, when decoding fails, the MTC device may attempt at decoding on a candidate whose t_AL is 8 in subframe #7. When decoding on the candidate whose t_AL is 8 in the subframe #7 fails, the MTC device may attempt at decoding on a candidate whose t_AL is 16 in a subframe #15. In cases where the BS has transmitted the M-PDCCH based on t_AL of 16 and the MTC device successfully decodes the M-PDCCH in the subframe #7, the MTC device may fail to determine whether t_AL of the M-PDCCH candidate received by the MTC device is 8 or 16.

However, for the following reasons, the MTC device is required to identify t_AL of the M-PDCCH candidate which has been successfully decoded by the MTC device.

1) Early PDSCH reception: After transmission of the M-PDCCH is finished and a predetermined subframe is transmitted, transmission of a PDSCH scheduled by the corresponding M-PDCCH may start. In particular, in this case, a space between a position of a final subframe in which the M-PDCCH was transmitted and a position of a start subframe in which a scheduled PDSCH is to be transmitted may be uniformly fixed, regardless of t_AL of the M-PDCCH. Also, in cases where the MTC device receives an M-PDCCH transmitted according to t_AL having a small value is received, the MTC device may receive a PDSCH at an earlier timing, relative to an M-PDCCH transmitted according to t_AL having a great value. Thus, the MTC device cannot determine a starting point at which the PDSCH is to be transmitted until t_AL of the M-PDCCH candidate received by the MTC device is identified.

2) Distinguishing HARQ ACK transmission resource: As for an existing PDCCH (or EPDCCH), PUCCH transmission resource was determined according to a position of a first CCE (or ECCE). However, in the case of M-PDCCH, since CCEs (or ECCEs) of M-PDCCH candidates all have the same resource position, HARQ ACK transmission resources should be distinguished from each other through a new method. To this end, the MTC device is required to know t_AL (or an index of an M-PDCCH candidate) of an M-PDCCH candidate received by the MTC device.

3) Determination of a repetition level of PDSCH/PUSCH/PUCCH, etc.: In cases where an associated repetition level of a PDSCH, a PUSCH and/or a PUCCH is determined according to t_AL, the MTC device is required to know t_AL (or an index of an M-PDCCH) of the M-PDCCH candidate received by the MTC device to determine a repetition level of the PDSCH, the PUSCH and/or the PUCCH.

<Disclosure of Present Invention>

Thus, the present disclosure proposes a method for identifying t_AL (or an index of the M-PDCCH) of the M-PDCCH candidate received by the MTC device. In particular, the method of the present disclosure may be used for identifying t_AL of the M-PDCCH candidate received by the MTC device located in an area with enhanced coverage.

I. Method for Identifying t_AL of M-PDCCH Candidate

In this clause, several methods for the MTC device to identify t_AL (or an index of an M-PDCCH) of an M-PDCCH candidate received by the MTC device are proposed. The methods for identifying t_AL described in this clause may also be applied to a non-CE mode without enhanced coverage, as well as to the CE mode with enhanced coverage.

I-1. First Method: Use of Different Scrambling Codes for Each t_AL of M-PDCCH Candidate In order to allow the MTC device of low-complexity/low-specification/low-cost to identify t_AL of an M-PDCCH received by the MTC device or an index of the M-PDCCH candidate, the M-PDCCH may be scrambled using different scrambling codes according to t_AL of the M-PDCCH candidate (or an index of the M-PDCCH). Thus, the M-PDCCH may be scrambled by a scrambling code determined according to t_AL of a PDCCH. Thus, the MTC device may identify t_AL of the M-PDCCH candidate received by the MTC device by attempting at decoding on the M-PDCCH on the basis of several scrambling codes.

Figure 17:
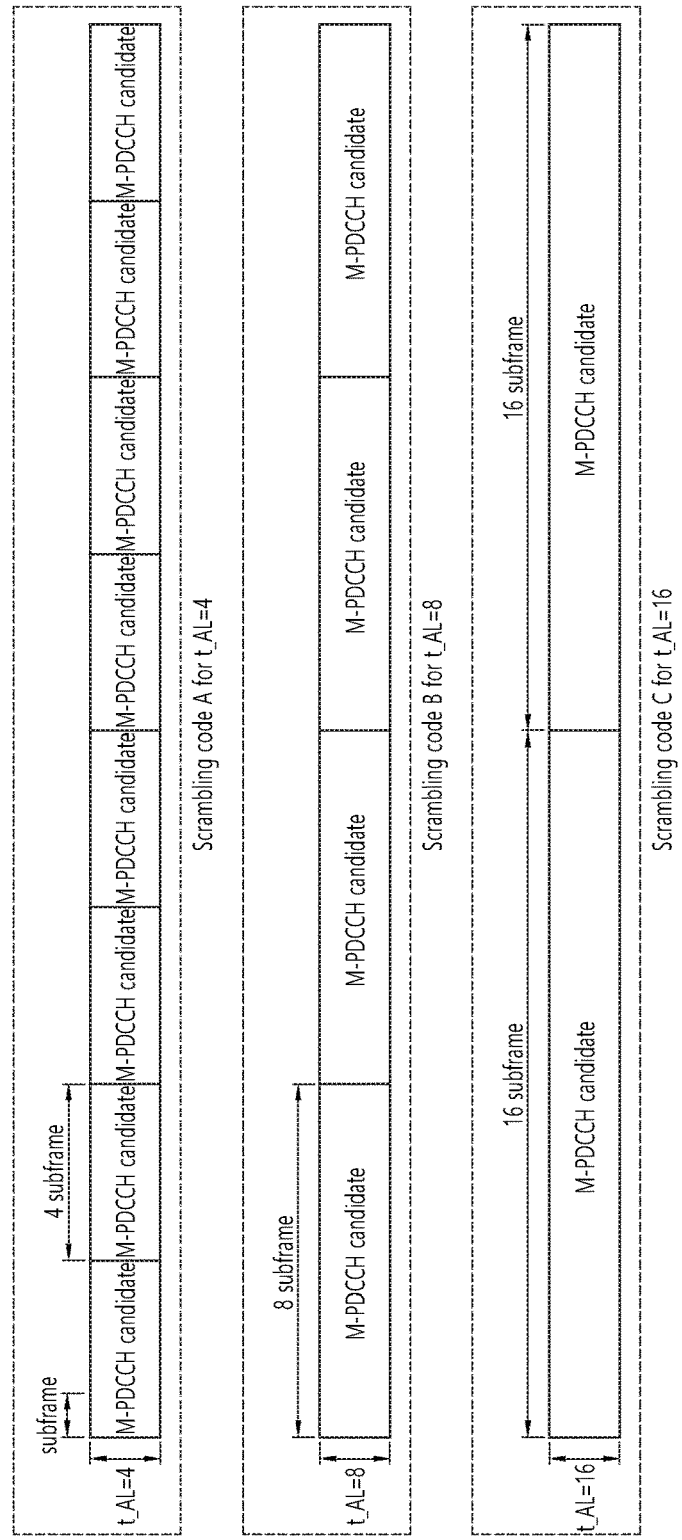
FIG. 17 illustrates scrambling according to a first method.

FIG. 17 illustrates scrambling according to a first method.

As illustrated in FIG. 17, M-PDCCH candidates having different t_AL are always terminated in transmission in positions of different subframes. Thus, the M-PDCCH may be scrambled using different scrambling codes according to an index of a subframe in which transmission of the M-PDCCH candidate was terminated.

As for scrambling proposed in this method, only data of the M-PDCCH may be scrambled but a DMRS, in addition to the data of the M-PDCCH, may also be scrambled. In detail, scrambling methods proposed in this disclosure may be performed as illustrated in Table 3 and Table 4.

TABLE 3

Since M-PDCCH candidates having different t_AL are always terminated in transmission in positions of different subframes, scrambling of the present method is performed on the basis of a termination index of a subframe, rather than a starting index of the subframe, as follows.
- In the case of scrambling a block of bits b(0), . . . , b($M_{bit}$ − 1) to be transmitted on an M-PDCCH including subframes #i to #j (or MCCE #i to MCCE #j), a block of scrambled bits $\tilde{b}$(0), . . . , $\tilde{b}$($M_{bit}$ − 1) may be scrambled as follows.
- $\tilde{b}$(j) = (b(j) + c(j)) mod 2
- Here, a scrambling sequence c(j) may be initialized by $c_{init} = \lfloor n_s/2 \rfloor \cdot 2^9 + n_{ID,m}^{M\text{-}PDCCH}$, and m is a number set by the M-PDCCH.
In other words, a slot index of a terminated subframe may be used for scrambling of a control channel in a position where repetition of the M-PDCCH is terminated. Thus, the MTC device may use the slot index to determine a repetition level for repeating a control channel.

TABLE 4

Scrambling of a DMRS for UE-specific search space (USS) may be performed as follows.
- Scrambling is performed in each subframe
- Scrambling is performed in each of a plurality of subframe sets (I/O combining over a plurality of subframes may be allowed)
- Scrambling is performed in each starting subframe of a repeated control channel (scrambling may be performed equally on every repetition over different repetition levels, regardless of a plurality of blind decoding candidates)
- Scrambling is performed in each terminated subframe of a repeated control channel of each blind decoding candidate (an index of a terminated subframe may be used in scrambling, similarly to scrambling of the M-PDCCH)

I-2. Second Method: Application of Frequency Shifting of RE Mapping According to t_AL of M-PDCCH Candidate In order to allow the MTC device of low-complexity/low-specification/low-cost to identify t_AL of an M-PDCCH received by the MTC device or an index of the M-PDCCH, a different amount of frequency shifting may be performed on RE mapping of the M-PDCCH according to t_AL of the M-PDCCH (or an index of the M-PDCCH). That is, compared with the conventional case in which the M-PDCCH is RE-mapped, starting from a resource having a lowest frequency index within a resource in which the M-PDCCH is transmitted, order of a frequency axis resource to which M-PDCCH is mapped may be circular-shifted on the basis of a frequency axis. Here, a degree of circular shifting is differently applied according to t_AL of the M-PDCCH candidate (or an index of the M-PDCCH candidate) so that the MTC device may identify the t_AL of the M-PDCCH candidate or the index of the M-PDCCH candidate received by the MTC device.

The circular shifting proposed in this method is described on the basis of a frequency axis resource, but it may also be performed on the basis of a time axis resource. In detail, circular shifting proposed in this method may be performed as follows.

(2-1) Method

RE-mapping of an M-PDCCH may be circular-shifted by a certain number of subcarriers regarding the entire PRB region (e.g., six PRBs within a system bandwidth) in which the M-PDCCH is transmitted. Here, the number of circular-shifted subcarriers may be determined according to t_AL of the M-PDCCH candidate or the index of the M-PDCCH candidate. An embodiment of circular shifting proposed in this method will be described with reference to FIG. 18.

Figure 18:
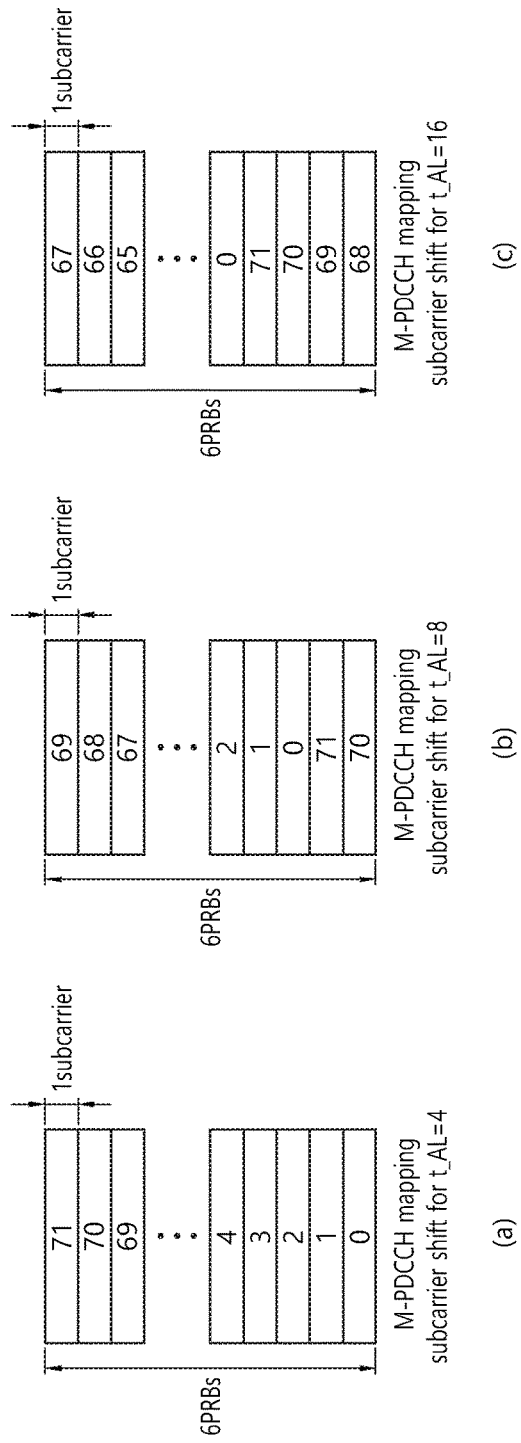
FIG. 18 illustrates circular shifting according to a (2-1) method.

FIG. 18 illustrates circular shifting according to the (2-1) method.

As illustrated in FIG. 18, an M-PDCCH mapped to six PRBs may be circular-shifted by two subcarriers. That is, the number of circular-shifted subcarriers may be varied according to t_AL of the M-PDCCH. More characteristically, in cases where the number of t_AL monitored by the MTC device is L, a degree to which the subcarrier is circular-shifted within six PRBs may be equal to subcarriers of a multiple of 12*6/L=72/L.

(2-2) Method

RE mapping of the M-PDCCH may be circular-shifted by a certain number of subcarriers within each PRB in which the M-PDCCH is transmitted. Here, the circular-shifted subcarriers may be determined according to t_AL of the M-PDCCH candidate or an index of the M-PDCCH candidate. More characteristically, in cases where the number of t_AL monitored by the MTC device is L, a degree to which the subcarrier is circular-shifted within each PRB may be equal to subcarriers of a multiple of 12/L.

(2-3) Method

RE mapping of the M-PDCCH may be circular-shifted by a certain number of subcarriers in the entire PRB region (e.g., six PRBs within a system bandwidth) in which the M-PDCCH is transmitted. Here, the circular-shifted subcarriers may be determined according to t_AL of the M-PDCCH candidate or the index of the M-PDCCH candidate. More characteristically, in cases where the number of t_AL monitored by the MTC device is L, a degree to which the subcarrier is circular-shifted within six PRBs may be equal to subcarriers of a multiple of 6/L.

I-3. Third Method: Application of Different RE Mapping to Each t_AL of M-PDCCH Candidate In order for the MTC device of low-complexity/low-specification/low-cost to identify t_AL of an M-PDCCH candidate or an index of the M-PDCCH received by the MTC device, an RE mapping method of the M-PDCCH may be changed according to t_AL of an M-PDCCH candidate (or the index of the M-PDCCH). However, compared with the second method, in the third method, (E)CCE may be RE-mapped according to different order, rather than simply shifting on the basis of frequency or time axis.

For example, when the M-PDCCH is configured in order of (E)CCE 0, 1, 2, and 3, RE mapping of the M-PDCCH is performed within RE resource forming (E)CCE 1. Thereafter, RE mapping of the M-PDCCH may be performed in order of (E)CCE 2 and (E)CCE 3. Here, order of (E)CCE in which the M-PDCCH is RE-mapped is differently applied according to t_AL of the M-PDCCH candidate (or the index of the M-PDCCH candidate), so that the MTC device may identify t_AL of the M-PDCCH candidate or the index of the M-PDCCH candidate received by the MTC device. In detail, RE mapping proposed in this method may be performed as follows.

(3-1) Method

An index of (E)CCE order in which the M-PDCCH is RE-mapped may be circular-shifted by a certain value. Here, the index circular-shifted value may be determined according to t_AL of the M-PDCCH candidate or the index of the M-PDCCH candidate. For example, M-PDCCH candidate 0 may be RE-mapped in order of (E)CCE 0, 1, 2, and 3, while M-PDCCH candidate y may be RE-mapped in order of (E)CCE (y) mod 4, (y+1) mod 4, (y+2) mod 4, and (y+3) mod 4.

(3-2) Method

An index of an EREG forming (E)CCE may be circular-shifted by a certain value. Here, the index circular-shifted value may be determined according to t_AL of the M-PDCCH candidate or the index of the M-PDCCH candidate. For example, when (E)CCE k forming M-PDCCH candidate 0 includes EREG k1, EREG k2, EREG k3, EREG k4, (E)CCE k forming M-PDCCH candidate y may be RE-mapped in order of EREG (k1+y) mod M, EREG (k2+y) mod M, EREG (k3+y) mod M, EREG (k4+y) mod M. Here, M is the number of EREG regarding PRB.

(3-3) Method

A position of a PRB of each EREG forming (E)CCE may be circular-shifted by a certain value. Here, the number of circular-shifted PRBs may be determined according to t_AL of the M-PDCCH candidate or the index of the M-PDCCH candidate. For example, when (E)CCE k forming M-PDCCH candidate 0 includes PRB #m의 EREG k1, EREG k2, EREG k3, EREG k4, (E)CCE k forming M-PDCCH candidate y may be RE-mapped in order of PRB #(m mod 6) 의 EREG k1, EREG k2, EREG k3, EREG k4.

(3-4) Method

It is a combination of the (3-2) method and the (3-3) method. An index of EREG forming (E)CCE may be circular-shifted by a certain value 1, and a position of PRG of each EREG may be circular-shifted by a certain value 2.

I-4. Fourth Method: DCI Scrambling

In order for the MTC device of low-complexity/low-specification/low-cost to identify an index of t_AL of the M-PDCCH candidate or the index of the M-PDCCH candidate received by the MTC device, a cyclic redundancy check (CRC) is added to downlink control information (DCI) intended to be transmitted, and DCI and/or CRC may be scrambled using different scrambling codes according to t_AL of the M-PDCCH candidate (or the index of the M-PDCCH candidate). Some embodiments of scrambling proposed in this method will be described with reference to FIG. 19.

Figure 19:
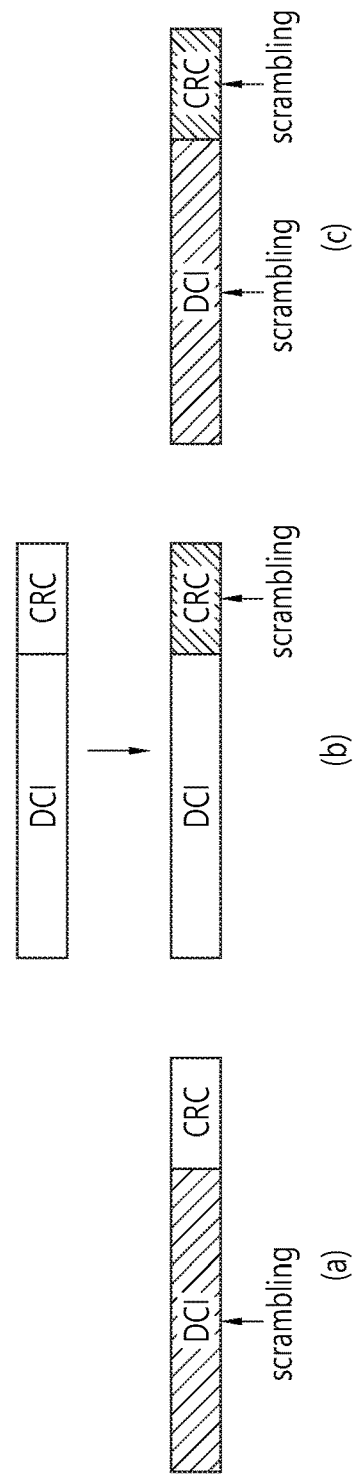
FIG. 19 illustrates scrambling according to a fourth method.

FIG. 19 illustrates scrambling according to a fourth method.

As illustrated in FIG. 19, regarding CRC-added DCI, the M-PDCCH may be scrambled using different scrambling codes according to t_AL of the M-PDCCH candidate (or the index of the M-PDCCH candidate). In detail, scrambling may be performed only on the DCI as illustrated in (a) of FIG. 19, scrambling may be performed only on the CRC as illustrated in (b), and scrambling may be performed on both DCI and CRC as illustrated in (c). Thus, the MTC device may identify t_AL of the M-PDCCH candidate received by itself by attempting decoding on the M-PDCCH on the basis of several scrambling codes. Also, a specific process of scrambling proposed in this method may be performed in the same manner as that described through Table 3 and Table 4, but the present invention is not limited thereto.

II. Blind Detecting Method

In the above, the method for blind-detecting t_AL of the M-PDCCH received by the MTC device, which is appropriate for the coverage enhancement (CE) mode has been described. In this clause, a blind detecting method which may also be appropriate for a non-CE mode is proposed. In general, when the MTC device is positioned in the CE mode, a repeated subframe number of the M-PDCCH may be greater than 1, but even in the case where the repeated subframe number of the M-PDCCH is 1, blind detecting should be performed.

In the non-CE mode, the MTC device may transmit the M-PDCCH using only some resources (some (E)CCEs), similar to the conventional EPDCCH transmission, rather than transmitting the M-PDCCH using every PRB resource (e.g., six PRBs) of a reduced bandwidth. That is, in the non-CE mode, the M-PDCCH may be transmitted using only some resources of the six PRBs according to aggregation level (AL) 1, 2, 4, 8 or 16.

In this clause, every t_AL in which the M-PDCCH can be transmitted in the CE mode and in the non-CE mode is proposed. Here, a network has flexibility to be dynamically applied to a range from M-PDCCH transmission using a very small amount of resource such as in the case where t_AL is 1 in the non-CE mode to M-PDCCH transmission using a very large amount of resource such as in the case where t_AL is 16 in the CE mode. That is, the network may transmit the M-PDCCH adaptive to various channel situations. Such a transmission may be appropriate for an MTC device (e.g., a wearable device) with mobility.

In cases where the M-PDCCH is always transmitted using every available resource of a reduced bandwidth (e.g., six PRBs) in the CE mode, although M-PDCCHs having different t_AL, they are transmitted through the same signal in the same resource of the same subframe. Thus, the MTC device may aggregate a signal received for decoding the M-PDCCH having a small t_AL to a signal transmitted through additional resources in the M-PDCCH having a relatively greater t_AL and perform decoding. Here, effects of simple implementation and a reduction in a buffer size may be obtained when the MTC device performs blind detection on various t_ALs.

Similarly, the method may also be similarly applied in performing blind detection on various t_ALs in the non-CE mode. That is, the MTC device may perform decoding by aggregating the signal transmitted through the additional resource in the M-PDCCH having a relatively great t_AL to the signal received for decoding of the M-PDCCH having a small t_AL. To this end, M-PDCCH candidates having different t_ALs should be transmitted through the same signal in the same RE resource of the same subframe. In this manner, a method for transmitting an M-PDCCH will be described with reference to FIG. 20.

FIG. 20 illustrates a method for transmitting an M-PDCCH according to an embodiment of the present invention will be described.

RE mapping of an M-PDCCH is preferentially performed on every RE resource in which the M-PDCCH can be transmitted in a PRB region in which the M-PDCCH can be transmitted, and thereafter, the M-PDCCH may be punctured and transmitted regarding an RE resource not forming the M-PDCCH. That is, as illustrated in (a) of FIG. 20, when every RE resource in which the M-PDCCH can be transmitted includes eight ECCEs, RE mapping of the M-PDCCH is preferentially performed on the corresponding resource. Thereafter, as illustrated in (b) of FIG. 20, when actual transmission resources of the M-PDCCH include ECCE 0 and 1, the M-PDCCH is punctured and transmitted regarding the other remaining RE resources than the corresponding resource. Alternatively, as illustrated in (c) of FIG. 20, when actual transmission resources of the M-PDCCH include 2, 3, 4, and 5, the M-PDCCH may be punctured and transmitted regarding the other RE resources than the corresponding resource.

For more simple implementation, regarding M-PDCCH candidates monitored by the MTC device, resource (ECCE resource or RE resource) forming M-PDCCH candidates of small t_AL may be configured as a subset region of a resource (ECCE resource or RE resource) forming M-PDCCH candidates of a relatively large t_AL.

Figure 21:
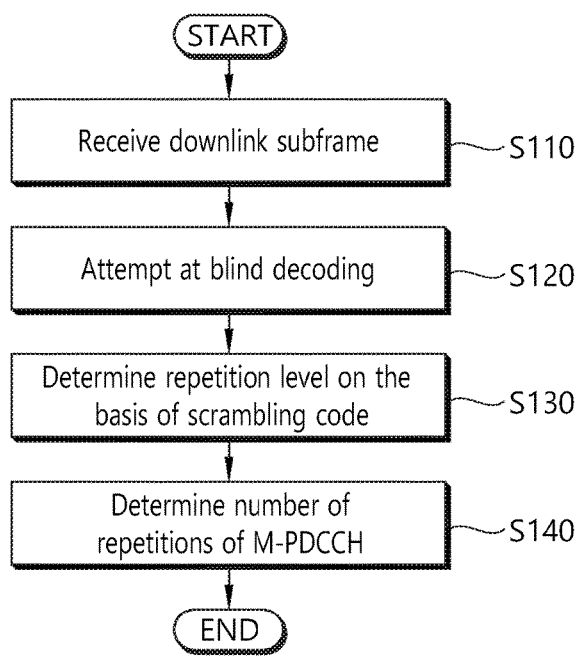
FIG. 21 is a flow chart illustrating a method for receiving an M-PDCCH according to an embodiment of the present invention.

FIG. 21 is a flow chart illustrating a method for receiving an M-PDCCH according to the present disclosure.

Referring to FIG. 21, the MTC device receives a plurality of downlink subframes in which a plurality of M-PDCCH candidates are repeatedly included (S110).

The MTC device attempts at blind decoding on a plurality of M-PDCCHs using one or more of a plurality of scrambling codes (S120).

When the blind decoding is successful, the MTC device determines a repetition level of the M-PDCCH on the basis of the corresponding scrambling code (S130). Here, the successfully blind-decoded scrambling code may be determined according to an index of a subframe, among the plurality of downlink subframes, in which repeated transmission of the M-PDCCH is terminated. Also, a DMRS for decoding the M-PDCCH may be decoded by a DMRS or the same scrambling code.

The MTC device may determine the number of repetitions of the M-PDCCH according to the determined repetition level (S140). On the basis of the determined repetition number, the MTC device may determine a position of a subframe in which transmission of a PDSCH is to start, identify a transmission resource of HARQ ACK, and further, determine a repetition level of a PDSCH, a PUCCH, and a PUSCH.

The embodiments of the present invention described above may be implemented through various units. For example, the embodiments of the present invention may be implemented by hardware, firmware, software, of any combinations thereof. Details thereof will be described with reference to the accompanying drawings.

Figure 22:
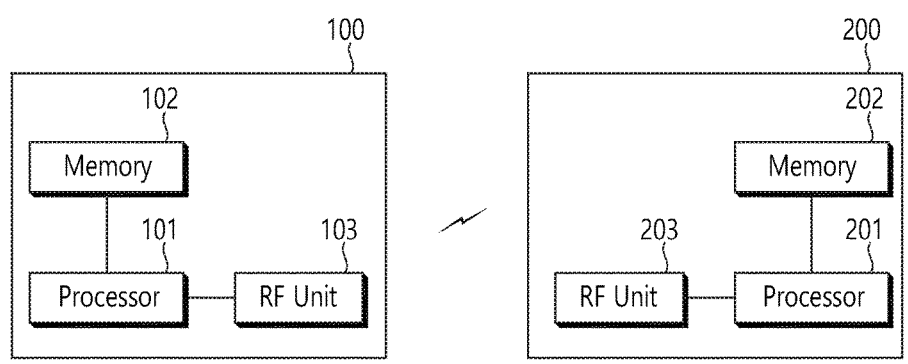
FIG. 22 is a block diagram showing a wireless communication system which implements the present invention.

FIG. 22 is a block diagram showing a wireless communication system which implements the present invention.

The base station 200 includes a processor 201, a memory 202, and a radio frequency RF unit 203. The memory 202 is connected to the processor 201 to store various information for driving the processor 201. The RF unit 203 is connected to the processor 201 to transmit and/receive a wireless signal. The processor 201 implements a suggested function, procedure, and/or method. An operation of the base station 200 according to the above embodiment may be implemented by the processor 201.

The MTC device 100 includes a processor 101, a memory 102, and an RF unit 103. The memory 102 is connected to the processor 101 to store various information for driving the processor 101. The RF unit 103 is connected to the processor 101 to transmit and/receive a wireless signal. The processor 101 implements a suggested function, procedure, and/or method.

The processor may include an application-specific integrated circuit (ASIC), another chipset, a logic circuit, and/or a data processor. A memory may include read-only memory (ROM), random access memory (RAM), a flash memory, a memory card, a storage medium, and/or other storage devices. An RF unit may include a baseband circuit to process an RF signal. When the embodiment is implemented, the above scheme may be implemented by a module procedure, function, and the like to perform the above function. The module is stored in the memory and may be implemented by the processor. The memory may be located inside or outside the processor, and may be connected to the processor through various known means.

In the above exemplary system, although methods are described based on a flowchart including a series of steps or blocks, the present invention is limited to an order of the steps. Some steps may be generated in the order different from or simultaneously with the above other steps. Further, it is well known to those skilled in the art that the steps included in the flowchart are not exclusive but include other steps or one or more steps in the flowchart may be eliminated without exerting an influence on a scope of the present invention.

What is claimed is:

1. A method for receiving a downlink control channel, which is repeatedly transmitted from a base station (BS) on a plurality of downlink subframes, the method performed by a wireless device in a wireless communication system and comprising:

performing, by the wireless device, a blind decoding on the downlink control channel, using one or more of a plurality of scrambling codes;

when the blind decoding is successful, determining, by the wireless device, a repetition level for the downlink control channel on the basis of the scrambling code by which the blind decoding was successful; and determining, by the wireless device, the number of repetitions of the downlink control channel according to the repetition level.

2. The method of claim 1, wherein the scrambling code by which the blind decoding was successful is determined according to the number of repetitions of the downlink control channel transmitted on the plurality of downlink subframes.

3. The method of claim 1, wherein the scrambling code by which the blind decoding was successful is determined according to an index of a downlink subframe in which repeated transmission of the downlink control channel is terminated, among the plurality of downlink subframes.

4. The method of claim 1, wherein a demodulation reference signal (DMRS) for decoding the downlink control channel is decoded by the scrambling code by which the blind decoding was successful.

5. The method of claim 1, further comprising:
determining a position of a subframe in which transmission of a downlink data channel is to start, on the basis of the determined repetition level.

6. The method of claim 1, further comprising:
identifying a transmission resource of a hybrid automatic repeat request (HARQ) acknowledgement (ACK) on the basis of the determined repetition level.

7. The method of claim 1, further comprising:
determining the number of repeatedly transmitting an uplink control channel or an uplink data channel on the basis of the determined repetition level.

8. A wireless device for receiving a downlink control channel which is repeatedly transmitted by a base station on a plurality of downlink subframes, the wireless device comprising:
a transceiver unit; and
a processor controlling the transceiver unit,
wherein the processor performs a procedure of:
performing a blind decoding on the downlink control channel using one or more of a plurality of scrambling codes;
when the blind decoding is successful, determining a repetition level for the downlink control channel on the basis of the scrambling code by which the blind decoding was successful; and
determining the number of repetitions of the downlink control channel according to the repetition level.

9. The wireless device of claim 8, wherein the scrambling code by which the blind decoding was successful is determined according to the number of repetitions of the downlink control channel transmitted on the plurality of downlink subframes.

10. The wireless device of claim 8, wherein the scrambling code by which the blind decoding was successful is determined according to an index of a downlink subframe in which repeated transmission of the downlink control channel is terminated, among the plurality of downlink subframes.

11. The wireless device of claim 8, wherein a demodulation reference signal (DMRS) for decoding the downlink control channel is decoded by the scrambling code by which the blind decoding was successful.

12. The wireless device of claim 8, wherein the processor further performs a procedure of determining a position of a subframe in which transmission of a downlink data channel is to start, on the basis of the determined repetition level.

13. The wireless device of claim 8, wherein the processor further performs a procedure of identifying a transmission resource of a hybrid automatic repeat request (HARQ) acknowledgement (ACK) on the basis of the determined repetition level.

14. The wireless device of claim 8, wherein the processor further performs a procedure of determining the number of repeatedly transmitting an uplink control channel or an uplink data channel on the basis of the determined repetition level.

* * * * *